United States Patent [19]
Hill

[11] Patent Number: 6,157,660
[45] Date of Patent: Dec. 5, 2000

[54] APPARATUS FOR GENERATING LINEARLY-ORTHOGONALLY POLARIZED LIGHT BEAMS

[75] Inventor: Henry Allen Hill, Tuscon, Ariz.

[73] Assignee: Zygo Corporation, Middlefield, Conn.

[21] Appl. No.: 09/507,529

[22] Filed: Feb. 18, 2000

Related U.S. Application Data

[60] Provisional application No. 60/137,685, Jun. 4, 1999.

[51] Int. Cl.$^7$ ......................................................... H01S 3/10
[52] U.S. Cl. ................................. 372/27; 372/13; 372/12; 372/34; 372/100; 372/66; 372/39; 372/32
[58] Field of Search ................................. 372/12, 13, 20, 372/27, 66, 39, 22, 23, 34, 100, 32

[56] References Cited

U.S. PATENT DOCUMENTS

| | | |
|---|---|---|
| 3,458,259 | 7/1969 | Bagley et al. . |
| 3,656,853 | 4/1972 | Bagley et al. . |
| 3,662,279 | 5/1972 | Sandstrom et al. . |
| 3,889,207 | 6/1975 | Burgwald et al. . |
| 4,684,828 | 8/1987 | Sommargren . |
| 4,687,958 | 8/1987 | Sommargren . |
| 5,095,491 | 3/1992 | Kozlovsky et al. . |
| 5,291,503 | 3/1994 | Geiger et al. . |
| 5,321,718 | 6/1994 | Waarts et al. . |
| 5,361,268 | 11/1994 | Fossey et al. . |
| 5,379,310 | 1/1995 | Papen et al. . |
| 5,394,414 | 2/1995 | Kozlovsky et al. . |
| 5,463,493 | 10/1995 | Shah . |
| 5,485,272 | 1/1996 | Dirksen et al. . |
| 5,640,405 | 6/1997 | Wallace et al. . |
| 5,661,737 | 8/1997 | Hecht et al. . |
| 5,708,672 | 1/1998 | Pessot et al. . |
| 5,835,512 | 11/1998 | Wada et al. . |
| 5,862,164 | 1/1999 | Hill ........................................... 372/27 |
| 5,917,844 | 6/1999 | Hill ........................................... 372/27 |
| 5,970,077 | 10/1999 | Hill ........................................... 372/13 |

OTHER PUBLICATIONS

H. Matsumoto, "Recent interferometric measurements using stabilized lasers", Precision Engineering, vol. 6 pp. 87–94 (19840.

Y. Ohtsuka and K. Itoh, "Two–frequency Laser Interferometer for Small Displacement Measurements in a Low Frequency Range", Applied Optics, vol. 18, pp. 219–224 (1979).

(List continued on next page.)

*Primary Examiner*—Leon Scott, Jr.
*Attorney, Agent, or Firm*—Francis J. Caufield

[57] ABSTRACT

The present invention relates to apparatus for providing orthogonally polarized light beams for use in precision metrology applications such as in the measurement of length or length changes using interferometric techniques. An input beam is introduced to a multifaceted anisotropic optically active acousto-optical crystal for travel through an interactive region where it experiences two acoustic beams that diffract it via small angle Bragg diffraction to form two orthogonally polarized internal beam components that are separated by a small angle of divergence and subsequently become external beam components available outside of the acousto-optical crystal for use in anticipated downstream applications. The acousto-optical crystal preferably is a uniaxial crystal comprising $TeO_2$. The degree of overlap or spatial separation between the energy flux profiles of the orthogonally polarized, external beam components may be controlled by refracting properties of the acousto-optical crystal, its birefringence, the acoustical and optical properties of the acousto-optical crystal, the length of the physical path of travel experienced by the emergent beam through the acousto-optical crystal and external birefringent elements. Thermal compensation may be provided via the control of the frequency of the first and second oscillators and/or the properties of the external birefringent elements.

27 Claims, 10 Drawing Sheets

OTHER PUBLICATIONS

N. Massie, et al., "Measuring Laser Flow Fields With a 64–Channel Heterodyne Interferometer", Applied Optics, vol. 22, pp. 2141–2151 (1983).

Y. Ohtsuka and M. Tsubokawa, "Dynamic Two–frequency Interferometry for Small Displacement Measurements", Optics and Laser Technology, Vos. 16, pp. 25–29 (1984).

N. A. Riza and M. M. K. Howlader, " Acousto–optic system for the generation and control of tunable low–frequency signals", Opt. Eng., vol. 35, pp 920–925 (1966).

J. B. Ferguson and R. H. Morris, "Single Mode Collapse in 6328 A HeNe Lasers", Applied Optics, vol. 17, pp 2924–2929 (1978).

T. Baer, et al., "Frequency Stabilization of a 0.633 um He–Ne–longitudinal Zeeman Laser", Applied Optics, vol. 19, pp. 3173–3177 (1980).

T. Okoshi and K. Kikuchi,"Frequency Stabilization of Semiconductor Lasers for Heterodyne–type Optical Communication Systems", Electronic Letters, vol. 16, pp. 179–181 (1980).

S. Yamagguchi and M. Suzuki, "Simultaneous Stabilization of the Frequency and Power of an AlGAAS Semiconductor Laser by Use of the Optigalvanic Effect of Krypton", IEEE Journal of Quantum Electronics, vol. QE–19, pp. 1514–1519, (1983).

R. W. Dixon, "Acoustic Diffraction of Light in Anisotropic Media", IEEE Journal of Quantum Electronics, vol QE–3, pp. 85–93 (1967).

A. Yariv and P.Yeh, Optical Waves In Crystals (Wiley, New York), Section 9.5.1 entitled "Small Angle Bragg Diffraction" (1984).

J. Bennett and H. Bennett, Section 7 of Chapter 10, "Double Refraction in Calcite, "Handbook of Optics (McGraw–Hill, New York) 1978.

N. Bobroff, "Recent advances in diaplacement measurement interferometry", Meas. Sci. Technol., vol. 4 pp. 907–926 (Sep. 1993).

G. Bouwhuis, "Interferometrie Mit Gaslasers", Ned. T. Natuurk, vol. 34, pp. 225–232 (Aug. 1968).

APPARATUS FOR GENERATING LINEARLY-ORTHOGONALLY POLARIZED LIGHT BEAMS

CROSS REFERENCE TO RELATED APPLICATION

This application claims priority from U.S. Provisional Patent Application Ser. No. 60/137,685 filed on Jun. 4, 1999 in the name of Henry Allen Hill and entitled "APPARATUS FOR GENERATING LINEARLY-ORTHOGONALLY POLARIZED LIGHT BEAMS", the entirety of which is incorporated herein by reference.

BACKGROUND OF THE INVENTION

The present invention relates to apparatus for transforming, with high diffraction efficiency, a single frequency, linearly polarized laser beam into a beam with two frequency components that are orthogonally polarized. More particularly, the invention relates to light beam generating apparatus that is useful in a variety electro-optical measuring devices that perform extremely accurate measurement of changes in either length or optical length.

The use of optical interferometry to measure changes in either length, distance, or optical length has grown significantly due not only to technological advances in lasers, photosensors, and microelectronics but also to an ever increasing demand for high precision, high accuracy measurements [cf. N. Bobroff, "Recent advances in displacement measuring interferometry," *Meas. Sci. Technol.,* 4(9), 907–926 (1993)]. Based on the signal processing technique used, prior art interferometers can be generally categorized into two types i.e., either homodyne or heterodyne. Interferometers based on the heterodyne technique are generally preferred because (1) they are insensitive to low frequency drift and noise and (2) they can more readily have their resolution extended. Within the heterodyne type of interferometers, of particular interest are the ones based on the use of two optical frequencies.

In the prior art two-optical frequency heterodyne interferometers, the two optical frequencies are produced by one of the following techniques: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (August 1968); Bagley et al., U.S. Pat. No. 3,656,853, issued Apr. 18, 1972; and H. Matsumoto, "Recent interferometric measurements using stabilized lasers," *Precision Engineering,* 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," *Applied Optics,* 18(2), 219–224 (1979); N. Massie et al., "Measuring Laser Flow Fields With a 64-Channel Heterodyne Interferometer," *Applied Optics,* 22(14), 2141–2151 (1983); Y. Ohtsuka and M. Tsubokawa, "Dynamic Two-frequency Interferometry for Small Displacement Measurements," *Optics and Laser Technology,* 16, 25–29 (1984); H. Matsumoto, ibid.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt. Eng.,* 35(4), 920–925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., ibid.; or (4) use of two longitudinal modes of a randomly polarized HeNe laser, see for example, J. B. Ferguson and R. H. Morris, "Single Mode Collapse in 6328 Å HeNe Lasers," *Applied Optics,* 17(18), 2924–2929 (1978).

As for the prior art use of a Zeeman split laser to produce the two optical frequencies, this approach appears to be only applicable to certain lasers (e.g., HeNe) and limits the frequency difference between the two optical frequencies to about 4 MHz. This imposes a limit on the maximum rate of change of the length or optical length being measured. In addition, the available power from a Zeeman split laser is typically less than 500 microwatts which can be a serious limitation when one laser source must be used for the measurement of multiple axes, such as three to six axes.

As for the prior art use of a single Bragg cell in the commonly owned U.S. Pat. No. 4,687,958 by Sommargren, the optic axis of the uniaxial crystal of the Bragg cell, the direction of the input optical beam, and the direction of the acoustic beam are approximately collinear. It appears that the diffraction efficiency can be low in U.S. Pat. No. 4,687,958 since a small change in the direction of the input beam, such as caused by diffraction, may result in an unacceptable momentum mismatch. Also in commonly owned U.S. Pat. No. 4,687,958 by Sommargren, the diffraction efficiency appears as though it may be low for a number of different types of uniaxial crystals because the efficiency of the dominant Bragg diffraction mode in this group of uniaxial crystals is proportional to the sine of the angle between the optic axis of the uniaxial crystal and either one or the other of the directions of the optical beam components or the direction of the acoustic beam. These two potential low diffraction efficiency problems are not encountered in the present invention because the optic axis of the uniaxial crystal and the direction of the acoustic beam are approximately orthogonal, i.e. small angle Bragg diffraction.

To compensate for the possibility of low diffraction efficiency resulting from the latter of these two reasons in U.S. Pat. No. 4,687,958, the path length in the uniaxial crystal of the Bragg cell may be increased. However, this procedure appears to lead to a uniaxial crystal that is inordinately long which, in turn, can result in an expensive apparatus. Also an extended length may lead to a diffracted beam with width elongated in the plane of diffraction and an increased lateral separation also in the diffraction plane between orthogonally polarized beam components.

As for the prior art use of a single Bragg cell in commonly owned U.S. Pat. No. 4,684,828 by Sommargren, the apparatus appears to have parts which are separated and require more space, is sensitive to misalignment of the various parts, is more sensitive to thermal gradients in the apparatus as a result of multiple parts and the required separation of multiple parts, and is not as efficient as the present invention, i.e., approximately 50% of the input beam intensity is transformed into the output beam with the commonly owned U.S. Pat. No. 4,684,828.

As for the prior art use of a single Bragg cell in Dirksen, et al., ibid., the efficiency is limited to approximately 80%, and there are significant non-uniform intensity distributions across the two orthogonally polarized exit beam components in contrast to the present invention described herein. These non-uniform intensity distributions across the width of the two orthogonally polarized exit beam components have a negative cross-correlation coefficient which further exacerbates the effect of non-uniform beam component intensities for interferometry.

There is generally more polarization mixing in both of the two exit beam components from the single Bragg cell apparatus of Dirksen et al., ibid., compared to the invention described herein since the apparatus of Dirksen et al., ibid., uses the normal Bragg diffraction mode, which limits its utility in precision interferometric measurements.

The Dirksen et al., ibid., single Bragg cell apparatus, which requires separation of parts, is sensitive to misalignment with additional sensitivity to thermal gradients.

As for the prior art use of two Bragg cells in apparatus of Dirksen et al., ibid., the apparatus has more parts than the single Bragg cell apparatus of Dirksen et al., ibid., which are well separated and require more space, there is generally polarization mixing in each of two exit beam components since the two Bragg cell apparatus of Dirksen et al., ibid., uses normal Bragg diffraction mode, is sensitive to misalignment of the various parts, is more sensitive to thermal gradients in the apparatus as a result of multiple parts and the required separation of multiple parts, is not as efficient as the apparatus of the present invention described herein, i.e., approximately 60% to 80% of the input beam intensity is transformed into the output beam with the two Bragg cell apparatus of Dirksen et al., ibid., as compared to nominally 100% with the apparatus described herein, has increased non-uniform intensity distributions across two orthogonally polarized exit beam components, and the non-uniform intensity distributions across widths of two orthogonally polarized exit beam components have negative cross-correlation coefficients which further exacerbates the effect of non-uniform beam component intensities.

Finally, although the prior art use of two longitudinal modes of a randomly polarized HeNe laser provides a laser beam with two orthogonally polarized frequencies in a rather convenient, cost-effective form, the frequency difference is approximately 500–600 MHz which requires complicated and expensive detection and processing electronics. Furthermore, by starting out with such a high frequency difference, the task of resolution extension becomes difficult and expensive.

Consequently, it is a primary object of this invention to provide apparatus for generating orthogonally polarized beams of different frequency with a predetermined angle of divergence between them and a predetermined lateral separation between their energy flux profiles.

In view of the properties of the prior art, it is yet another object of the present invention to provide apparatus for generating orthogonally polarized, parallel beams of different frequency that have energy flux profiles that are either partially coextensive or substantially coextensive.

Consequently, while prior art techniques for producing a laser beam with two optical frequencies of orthogonal polarization are useful for some applications, none known to applicant provide the technical performance in a commercially viable form for applications requiring the measurement of rapidly changing lengths (distances) to extremely high resolution.

Other objects of the invention will be obvious and will appear hereinafter in reading the following detailed description in connection with the drawings.

BRIEF SUMMARY OF THE INVENTION

The present invention relates to apparatus for providing orthogonally polarized light beams for use in precision metrology applications such as in the measurement of length or length changes using interferometric techniques. The orthogonally polarized light beams are preferably parallel but may beneficially have a predetermined angle of divergence between them. Several different embodiments of the invention are disclosed in the form of electro-optical devices for transforming a single-frequency, linearly polarized input beam from a light source, preferably a laser of frequency, $f_L$, into an output beam having two orthogonally polarized, preferably parallel output beam components differing in frequency from each other. The energy flux profiles of the output beam components may be spatially separated, partially coextensive, or substantially coextensive in accordance with the details of particular device embodiments. The input beam is introduced to a multifaceted anisotropic optically active acousto-optical crystal for travel through an interactive region where it experiences two acoustic beams that diffract it via small angle Bragg diffraction to form two orthogonally polarized internal beam components that are separated by a small angle of divergence and subsequently become external beam components available outside of the acousto-optical crystal for use in anticipated downstream applications.

In all of the embodiments, the multifaceted or multifaced anisotropic acousto-optical crystal has an optic axis, z, and first and second facets that are at a small angle to the optic axis. The acousto-optical crystal preferably is a uniaxial crystal comprising $TeO_2$.

Transducer means, preferably in the form of piezoelectric transducers, are affixed to the first and second acousto-optical crystal facets for generating two acoustic beams so that the two acoustic beams propagate generally perpendicular to the optic axis to provide two interaction regions within the optical crystal, where the widths of respective interaction regions are generally coextensive with the width of the acoustic beam. The orientations of the wave front vectors for the two acoustic beams are preferably in approximately opposing directions. The two acoustic beams preferably are shear waves.

The transducers are driven with electrical signals at frequencies $f^{(1)}$ and $f^{(2)}$, respectively, from respective electronic oscillators and electronic amplifiers. The electrical signals are transformed to the two acoustic shear waves via the transducers, and the acoustic shear waves propagate inside of the acousto-optical crystal to form the two interactive regions.

The polarization plane and angle of incidence of the input laser beam at an entrance facet of the acousto-optical crystal may be chosen so that the frequencies of the external beam components may be both higher or both lower than the laser frequency, $f_L$, by the frequency $f^{(1)}$ of the first oscillator and the sum of the frequencies of the two oscillators $f^{(1)}+f^{(2)}$.

The input laser beam is introduced into the acousto-optical crystal so that it propagates through the first interaction region at least once with a predetermined portion of it converted by small angle Bragg diffraction to a first diffracted beam. The first diffracted beam, which is derived from the initial input beam, is orthogonally polarized with respect to the input beam and altered in frequency by the frequency, $f^{(1)}$, of the first oscillator. The first diffracted beam propagates through the second interaction region at least once with a predetermined portion of it converted by small angle Bragg diffraction to a second diffracted beam. The non-diffracted portion of the first diffracted beam and the second diffracted beam continue to propagate through the anisotropic acousto-optical crystal along a path as slightly diverging orthogonally polarized emergent beams. The emergent beams are intercepted upon emerging from the acousto-optical crystal to be rendered preferably parallel by collimating means. The collimating means are in the form of external birefringent elements. However, if desired, the external beams can be non-parallel such that they have a predetermined angle of divergence between them.

The degree of overlap or spatial separation between the energy flux profiles of the orthogonally polarized, external beam components may be controlled by refracting properties of the acousto-optical crystal, its birefringence, the acoustical and optical properties of the acousto-optical crystal, the length of the physical path of travel experienced by the emergent beam through the acousto-optical crystal and external birefringent elements. Thermal compensation may be provided via the control of the frequency of the first and second oscillators and/or the properties of the external birefringent elements.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DETAILED DESCRIPTION OF THE INVENTION

Figure 1A:
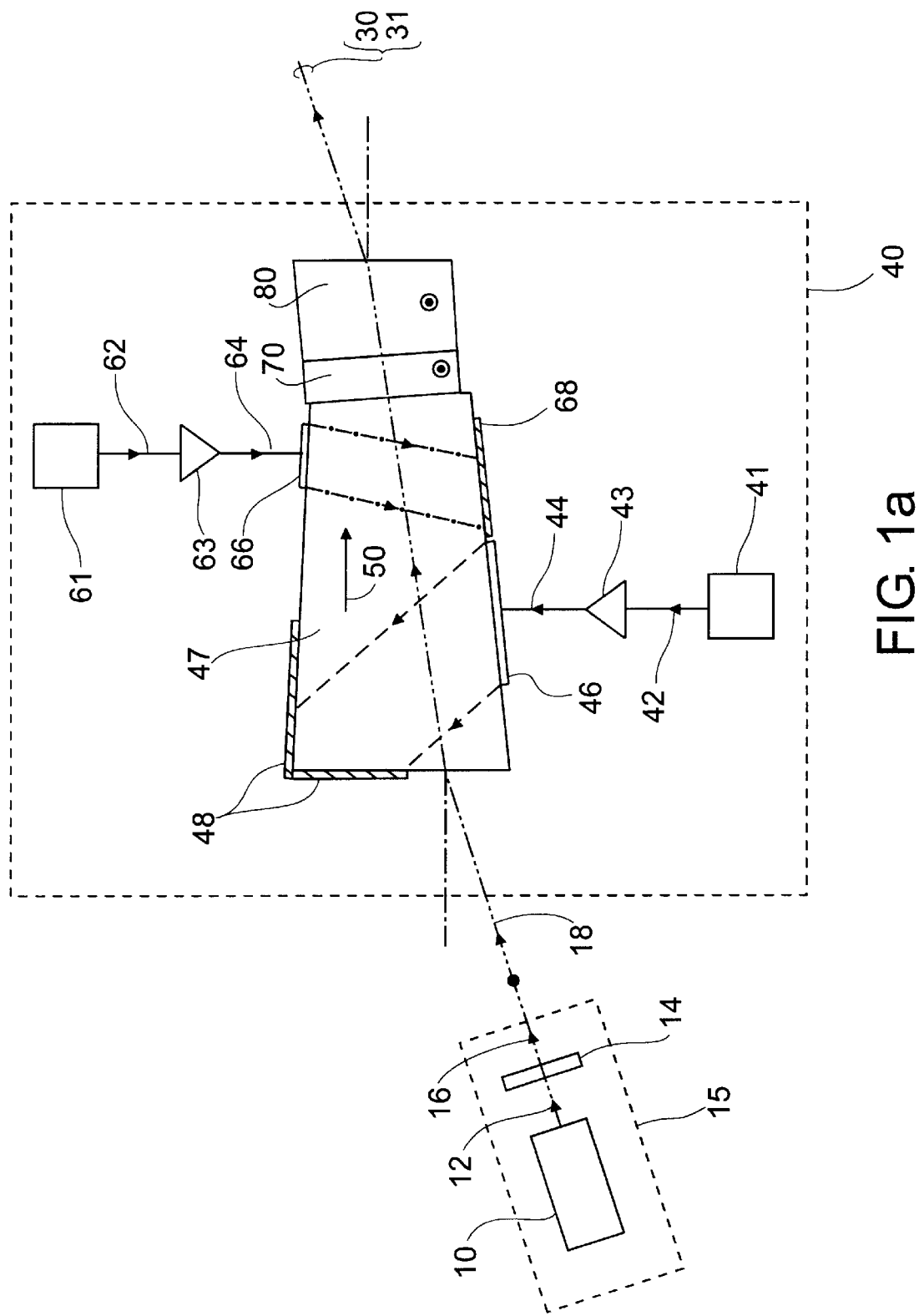
FIG. 1a is a diagrammatic plan view of apparatus of the first embodiment of the present invention showing in combination a laser light source and an acousto-optic modulator cell that transforms the output of the laser beam into two linearly-orthogonally polarized light beams.

The present invention relates to apparatus for providing linearly-orthogonally polarized light beams for use in precision metrology applications such as in the measurement of length or length changes using interferometric techniques. Several different embodiments of the invention are disclosed in the form of electro-optical devices for transforming an input beam comprising a single-frequency linearly-polarized beam from a light source, such as a laser, into a beam comprised substantially of two linearly-orthogonally polarized, preferably parallel output beams differing in frequency from each other and from the frequency of the input beam. The directions of propagation of the output beams are preferably parallel although they need not be and the output beams may beneficially have their own predetermined angle of divergence or convergence. In addition, energy flux profiles of the output beams may be spatially separated, partially coextensive, or substantially coextensive in accordance with the details of particular device embodiments and the requirements of the metrology or other contemplated application.

In addition, for end use applications requiring reduced sensitivity of certain properties of apparatus of the electro-optical devices to changes in temperature of the devices, compensation of certain thermal effects is achieved in embodiments through exploitation of temperature dependence of refractive indices of optical materials comprising the apparatus and/or exploitation of acoustic beam wavelength dependence on acoustic beam frequency for acoustic beams used in acousto-optical diffraction performed in the apparatus. The certain thermal effects comprise effects of temperature of the apparatus on the average direction of propagation of the output beams and on the difference in directions of propagation of the output beams. The effects of temperature of the apparatus on the average direction of propagation of the output beams is compensated in each of the embodiments of the present invention and the effects of temperature of the apparatus on the difference in directions of propagation of the output beams is compensated in certain of the embodiments of the present invention. The compensation may or may not be implemented depending on requirements of an end use application.

Referring to the drawings in detail, and initially to FIGS. 1a–1e, FIG. 1a depicts, in diagrammatic form, the presently first preferred embodiment of the present invention. While the apparatus of the present invention has application for a wide range of radiation sources of optical energy, the following description is taken, by way of example, with respect to an optical measuring system. The term "optical energy" as used herein includes, but is not limited to, electromagnetic energy of all frequency ranges.

In accordance with the first embodiment, an acousto-optical apparatus is provided that is capable of transforming a single frequency linearly polarized input beam into a beam comprised of two output beams and a series of spurious, secondary output beams. The input beam is comprised of a single beam. The output beams are substantially linearly, orthogonally polarized, preferably having the same directions of propagation, and preferably having coextensive energy flux profiles. The frequencies of the output beams are different one from the other and different from the frequency of the input beam. The intensities of the two output beams are substantially equal, and the combined intensities of the output beams are substantially equal to the intensity of the input beam. In addition, compensation of both the certain thermal effects is accomplished in the first embodiment through exploitation of both the temperature dependence of refractive indices of optical materials comprising the acousto-optical apparatus and exploitation of acoustic beam wavelength dependence on acoustic beam frequency of acoustic beams used in acousto-optical diffraction performed in the acousto-optical apparatus.

Referring to FIG. 1a, light beam source 15 generates beam 18 which comprises the input beam. Beam 18 enters a acousto-optical modulator cell 47 of an acousto-optical apparatus 40 and exits apparatus 40 as output beams 30 and 31 and the series of secondary output beams. Output beams 30 and 31 are substantially linearly polarized.

A source of a first subset of the secondary output beams is the elliptically polarized eigenmodes for the propagation of light beams in acousto-optical modulator cell 47 comprising an optically active anisotropic crystal. The elliptical polarization of the eigenmodes of acousto-optical modulator cell 47 and the boundary conditions that must be satisfied by electric and magnetic fields of light beams being reflected and refracted at interfaces of optically active anisotropic crystals generate the first subset of the secondary output beams. These certain of the secondary output beams generally have reduced intensities in the apparatus of the first embodiment. The first subset of the secondary beams have directions of propagation different from the directions of propagation of output beams 30 and 31 principally because of properties of birefringent truncated prisms 70 and 80.

Input beam 18 enters acousto-optical modulator cell 47 and, through an acousto-optical interaction with a first acoustic beam, is converted to an intermediate beam. The intensity of the intermediate beam is preferably substantially the same as the intensity of input beam 18. The intermediate beam subsequently passes through a second acoustic beam. By way of an acousto-optical interaction of the intermediate beam with the second acoustic beam, a portion of the intermediate beam is converted into a beam exiting acousto-optical apparatus 40 as one of the output beams 30 and 31 with the remaining non-converted portion of the intermediate beam exiting acousto-optical apparatus 40 as the other of the output beams 30 and 31.

Incomplete conversion of input beam 18 into the intermediate beam generates a second subset of the secondary output beams. The second subset of the secondary beams have reduced intensities in the apparatus of the first embodiment and have directions of propagation different from the directions of propagation of output beams 30 and 31.

Acousto-optical interaction of acoustic beams that result from a portion of the second acoustic beam reflected by absorber 68 and the optical beam remaining as a result of incomplete conversion of input beam 18 into the intermediate beam may generate a third set of beams of the secondary beams. The third set of secondary beams have in the apparatus of the first embodiment reduced intensities, frequencies different from the frequencies of output beams 30 and 31. However, the direction of propagation of the third set of secondary beams is parallel to the directions of propagation of output beams 30 and 31.

Eigenmodes for propagation of light beams in optically active anisotropic crystals generally comprise two modes, a left-handed rotating elliptically polarized mode and a right-handed rotating elliptically polarized mode. The two eigenmodes for light beam propagation in a left-handed rotating positive uniaxial crystal are left-handed and right-handed rotating elliptically polarized modes with the major axes of the eigenmodes coinciding with the directions of polarization of ordinary and extraordinary polarized beams, respectively. The major axes of a left-handed rotating elliptically polarized beam and a right-handed rotating elliptically polarized beam are orthogonal to and in the plane, respectively, of FIG. 1a.

Ellipticities of the two eigenmodes are the same. The ellipticity $\xi(\vartheta)$ of the eigenmodes can be written as [see Section 1.3 of J. Xu and R. Stroud, *Acousto-Optic Devices: Principles, Design, and Applications* (Wiley-New York) 1992]

$$\xi(\vartheta) = \frac{\Delta n_a(\vartheta)}{\Delta n_b(\vartheta) + \{[\Delta n_b(\vartheta)]^2 + [\Delta n_a(\vartheta)]^2\}^{1/2}} \quad (1)$$

where $\Delta n_b(\vartheta)$ and $\Delta n_a(\vartheta)$ are differences in the refractive indices due to birefringence and optical activity, respectively, for a beam propagating at an angle $\vartheta$ with respect to the optic axis of an anisotropic crystal. For uniaxial crystals, the a dependency of $\Delta n_b(\vartheta)$ and $\Delta n_a(\vartheta)$ are explicit functions of the angle $\vartheta$.

The value for $\Delta n_b(\vartheta)$ may be written for uniaxial crystals as $$\Delta n_b(\vartheta) = (n_e - n_o)\sin^2\vartheta \quad (2)$$

and an approximate expression for $\Delta n_a(\vartheta)$ can be written for crystal classes 3, 32, 4, 422, 6, and 622 as $$\Delta n_a(\vartheta) = (n_r - n_l)\cos^2\vartheta \quad (3)$$

where $n_r$ and $n_l$ are the refractive indices caused by optical activity for light propagating along the optic axis and $n_e$ and $n_o$ are the refractive indices for extraordinary and ordinary beams, respectively, propagating orthogonal to the optic axis. Examples of crystals for which Eqs. (2) and (3) apply are a $TeO_2$ crystal, paratellurite, and crystals of mercurous halides $Hg_2Cl_2$, $Hg_2Br_2$, and $Hg_2I_2$ belonging to the 422 crystal class and quartz belonging to the 32 crystal class.

Ellipticity $\xi(\vartheta)$ given by Eq. (1) can be written to a good approximation for uniaxial crystals, e.g. paratellurite, as $$\xi(\vartheta) = \frac{n_r - n_l}{2(n_e - n_o)}\cot^2\vartheta, \quad \vartheta \geq 0.1. \quad (4)$$

Based on measured values of $(n_r - n_l)$ and $(n_e - n_o)$ for an optical wavelength of 0.633 $\mu$m, the $\xi(\vartheta)$ expressed by Eq. (4) for paratellurite is $$\xi(\vartheta) = 0.000995 \cot^2\vartheta, \quad \vartheta \geq 0.1. \quad (5)$$

For values of $\xi(\vartheta)$ in paratellurite for angles $\vartheta \leq 10$ degrees and for other optical wavelengths, reference is made to Table 1.1 of Xu and Stroud, ibid.

It is apparent from Eq. (4) that the value of $\xi(\vartheta)$ is strongly dependent on the value of angle $\vartheta$ and that reduced values for $\xi(\vartheta)$ are effected through restricting corresponding values of angle $\vartheta$ to larger values rather than smaller values.

Deviation of the energy flux vector from a wave front vector for an optical beam propagating in a birefringent crystal, a well known property of birefringent crystals, causes a relative displacement of a beam from the path of the optical wave front vector. For the acousto-optical apparatus shown in FIG. 1a, the angle r between the energy flux vector of a beam and the optic axis of the acousto-optical modulator cell 47 is $$\tan r = \frac{n_o^2}{n_e^2} \tan \vartheta \qquad (6)$$

where $\vartheta$ is the angle between the normal to the wave front, i.e. the wave front vector, and the optic axis of the acousto-optical modulator cell 47 [see, e.g., Section 7 of Chapter 10 by J. Bennett and H. Bennett, "Double Refraction in Calcite," *Handbook of Optics* (McGraw-Hill, New York) 1978].

By mathematical manipulation of Eq. (6), the tangent of the difference (r–$\vartheta$) can be expressed as $$\tan(r - \vartheta) = \left( \frac{n_o^2 - n_e^2}{n_e^2 + n_o^2 \tan^2 \vartheta} \right) \tan \vartheta. \qquad (7)$$

The requirement for larger values of $\vartheta$ rather than smaller values for optical beams internal to acousto-optical modulator cell 47 associated with the output beams, vis-à-vis effecting reduced ellipticities for the internal optical beams, thus can cause a significant lateral displacement of output beams 30 and 31 one with respect to the other.

The net relative lateral displacements for beams 30 and 31 one with respect to the other, the displacements due to different directions of wave front vectors of internal optical beams in acousto-optical apparatus 40 and to deviations of energy flux vectors from corresponding wave front vectors for optical beams propagating in a birefringent medium, are compensated to a high level in the first embodiment of the present invention because of the design of compensating truncated prisms 70 and 80 shown in FIG. 1a. The optic axes for prisms 70 and 80 are 71 and 81, respectively, and are orthogonal to the plane of FIG. 1b.

Figure 1B:
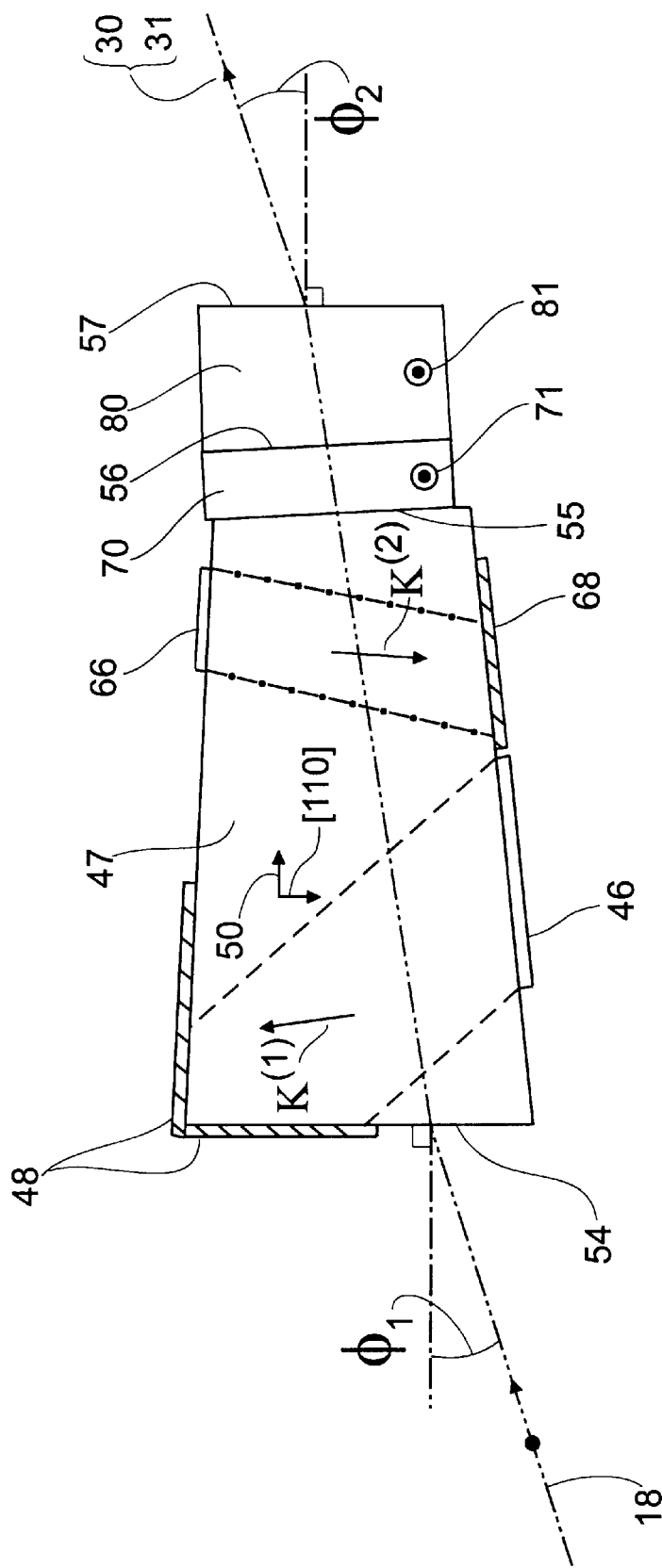
FIG. 1b is an enlarged diagrammatic view of the acousto-optical modulator cell of FIG. 1a showing in more detail the propagation of light beams through the cell.

FIG. 1b depicts in diagrammatic form the detailed propagation of input beam 18, as indicated by corresponding wave front vectors, through acousto-optical apparatus 40 comprising an anisotropic acousto-optical crystal such that the nominal angle between input beam 18 and output beams 30 and 31 is an angle, specified by the design of the acousto-optical cell 47 and compensating truncated prisms 70 and 80, of substantially 0 degrees and substantially independent of small changes in the orientation of the acousto-optical modulator cell 47 and compensating truncated prisms 70 and 80.

A light source 10, preferably a laser, provides a beam 12 of optical energy that has a single, stabilized frequency and is linearly polarized. Light source 10 can be any of a variety of lasers. For example, it can be a gas laser, e.g. a HeNe, stabilized in any of a variety of conventional techniques known to those skilled in the art to produce beam 12, see for example, T. Baer et al., "Frequency Stabilization of a 0.633 µm He-Ne-longitudinal Zeeman Laser," *Applied Optics*, 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, light source 10 can be a diode laser frequency stabilized in one of a variety of conventional techniques known to those skilled in the art to produce beam 12, see for example, T. Okoshi and K. Kikuchi, "Frequency Stabilization of Semiconductor Lasers for Heterodyne-type Optical Communication Systems," *Electronic Letters*, 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics*, QE-19, 1514–1519 (1983).

The specific device used for source 10 will determine the diameter and divergence of beam 12. For some sources, e.g. a diode laser, it will likely be necessary to use conventional beam shaping optics 14, e.g. a conventional microscope objective, to provide beam 16 with a suitable diameter and divergence for the elements that follow. When source 10 is a HeNe laser, for example, beam-shaping optics 14 may not be required. The elements 10 and 14 are shown in dashed box 15 that represents the source of beam 16. Beam 16 has one stabilized frequency $f_L$ and is linearly polarized.

It may also be necessary to incorporate in beam-shaping optics 14 spatial filtering to eliminate a potential source of polarization mixing. The potential source of polarization mixing is a consequence of wave front properties of beam 12 and of properties of acousto-optical apparatus 40.

The plane of polarization of beam 16 is rotated about the axis of beam 16 using techniques known to those skilled in the art, e.g. phase retardation plates, to form a beam comprised of input beam 18. Input beam 18 is linearly polarized perpendicular to the plane of FIG. 1a. Beam 18 further has an optical frequency $f_L$.

Beam 18 is incident on acousto-optical apparatus 40 as illustrated in FIG. 1a. The paths of wave front vectors of beams in acousto-optical modulator cell 47 originating from beam 18 as shown in FIG. 1b.

Input beam 18 in transit through acousto-optical modulator cell 47 encounters first and second acoustic beams generated by conventional piezoelectric transducers 46 and 66, respectively. Piezoelectric transducers 46 and 66 are driven by electrical outputs 44 and 64, respectively, from conventional power amplifiers 43 and 63, respectively. Electrical oscillators 41 and 61 (see FIG. 1a) provide frequency stabilized electrical signals 42 and 62, respectively, of frequencies $f^{(1)}$ and $f^{(2)}$, respectively, to power amplifiers 43 and 63, respectively, to generate electrical outputs 44 and 64, respectively. Transducers 46 and 66 may each comprise a single element or a multi-element array configuration affixed to the acousto-optical modulator cell 47.

The first and second acoustic beams are preferably of the shear wave type. Known to those skilled in the art of acousto-optical modulation, shear waves of the first and second acoustic beams may be generated with either piezoelectric transducers 46 and 66 affixed to acousto-optical modulator cell 47 as shown in FIG. 1b or either or both of the first and second shear waves generated by reflecting an appropriately directed longitudinal acoustic wave from an appropriately oriented surface or surfaces of cell 47.

The wave front vectors for the first and second acoustic beams are shown in FIG. 1b as $K^{(1)}$ and $K^{(2)}$, respectively. The respective boundaries of energy flux for the first and second acoustic beams are also indicated in FIG. 1b by dashed lines and dot-dashed lines, respectively.

Conventional techniques known to those skilled in the art of acousto-optical modulation are used to absorb in a preferred distribution the acoustic beams that pass through to walls of acousto-optical modulator cell 47 for the reduction of undesired reflected acoustic beams as well as for the purpose of substantially reducing temperature gradients in acousto-optical modulator cell 47. The absorption of acoustic beams at the walls of acousto-optical modulator cell 47 is by absorbers 48 and 68. Design of the absorber for the acoustic beam comprises a part of the overall design process for an acousto-optical modulator of the present invention.

The presently preferred acousto-optical modulator cell 47 of the first embodiment is made of an optically active, uniaxial crystal (e.g., paratellurite or quartz) having an optic axis 50 in the plane of FIG. 1*b* which makes an angle $\vartheta_a^{(1)}$ (cf. FIG. 7) with a normal to the direction of wave front vector $K^{(1)}$ of the first acoustic wave generated by the piezoelectric transducer 46. Superscript values of (1) and (2) are used herein to denote quantities associated with the first and second acoustic beams, respectively. The diagrammatic illustration in FIG. 1*b* is for an acousto-optical modulator cell 47 comprised of a left-handed rotating positive uniaxial crystal, e.g. paratellurite.

Figure 1C:
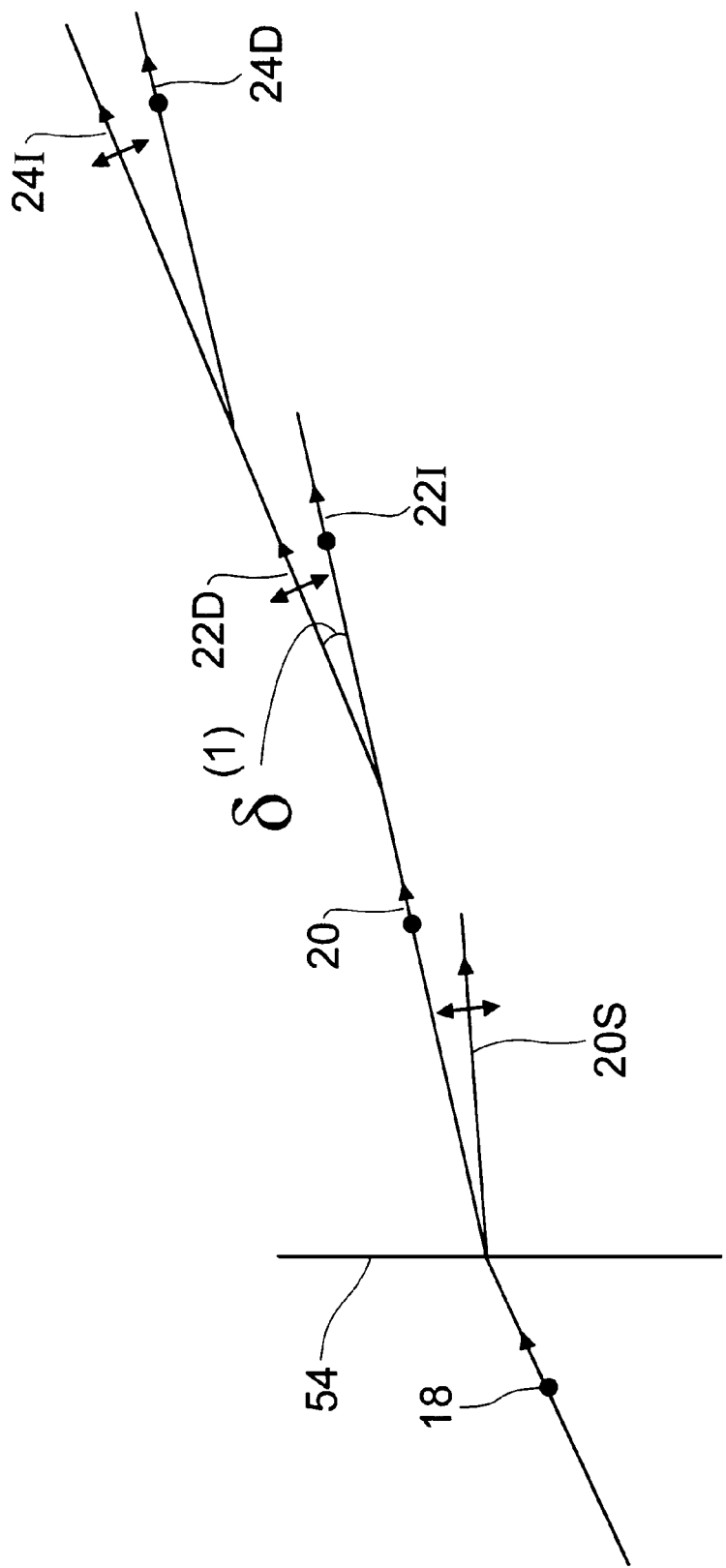
FIG. 1c is an enlarged diagrammatic view showing in more detail the behavior of various light beams at one of the facets of the acousto-optical modulator cell of FIG 1b.

Input beam 18 enters acousto-optical modulator cell 47 at surface 54 with an angle of incidence $\phi_1$ to form beams 20 and 20S (See FIG. 1*c*). The direction of beams shown in FIG. 1*c* are the direction of corresponding wave front vectors for the beams. The angle between beams 20 and 20S is small and, for purposes of illustration, is exaggerated in FIG. 1*c*. Surface 54 is antireflection coated for input beam 18. Beam 20 is a left-handed rotating elliptically polarized beam with respective major axes of the polarization being orthogonal to the planes of FIGS. 1*b* and 1*c*.

Figure 7:
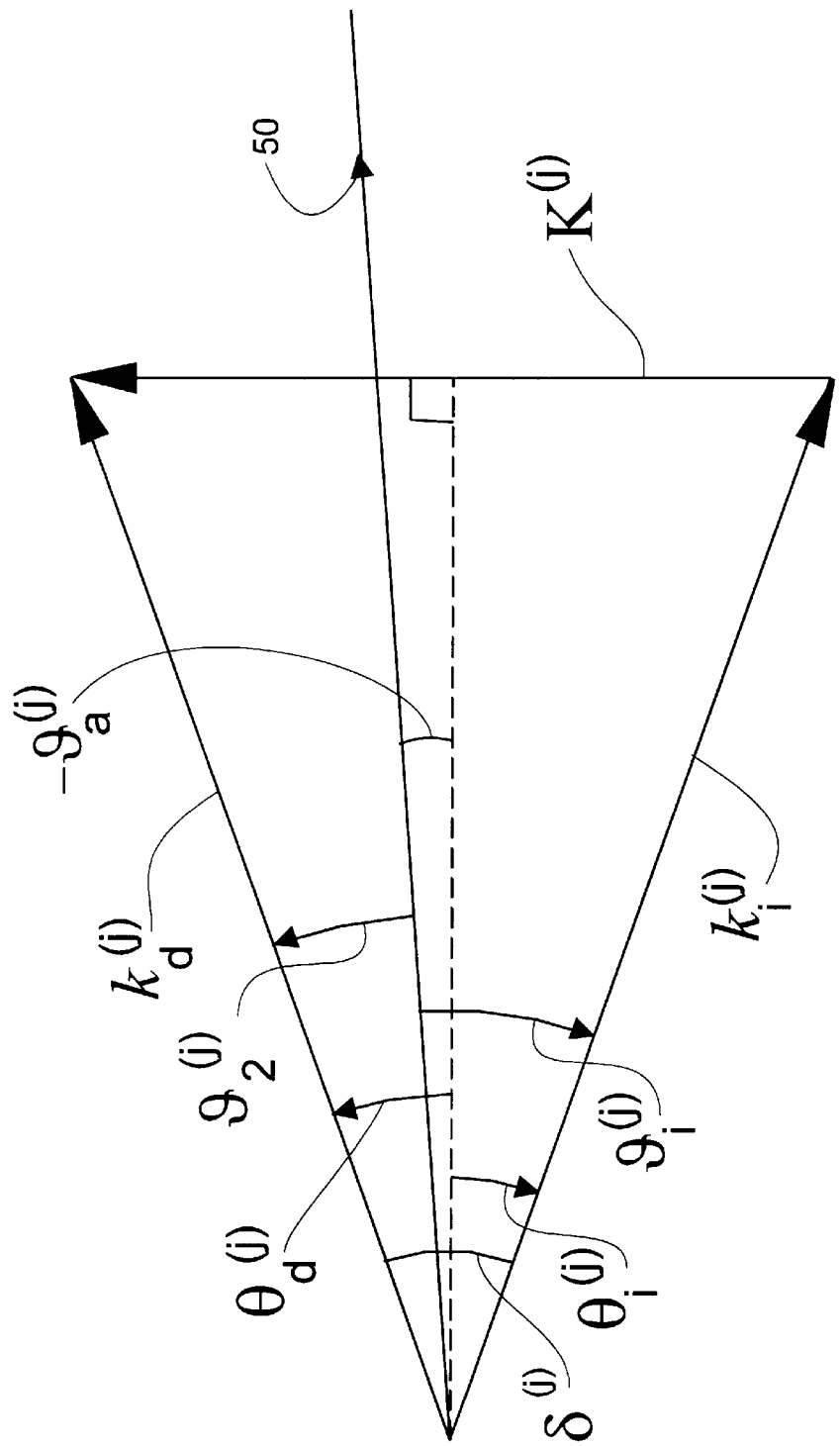
FIG. 7 depicts the relative orientations of the optical axis of the acousto-optical modulator cell of FIG. 1b and the wave front vectors for an acoustic beam, an incident optical beam, and a diffracted optical beam.

Due to a photoelastic interaction of incident beam 20 with the first acoustic wave having a wave front vector $K^{(1)}$ [see for example, R. W. Dixon, "Acoustic Diffraction of Light in Anisotropic Media," *IEEE Journal of Quantum Electronics,* QE-3, 85–93 (1967); A. Yariv and P. Yeh, *Optical Waves in Crystals* (Wiley, New York), Chap. 9, (1984); Xu and Stroud, ibid.], a non-diffracted beam 22I and a diffracted beam 22D are generated by small angle Bragg diffraction when the following relationships are satisfied for j=1;

$$\sin\theta_i^{(j)} = \frac{\lambda_0}{2n_i^{(j)}V^{(j)}(\vartheta_a^{(j)})} \times \qquad (8)$$

$$\left\{ f^{(j)} + \frac{[V^{(j)}(\vartheta_a^{(j)})]^2}{f^{(j)}\lambda_0^2}\left[n_i^{(j)2}(\vartheta_1^{(j)}) - n_d^{(j)2}(\vartheta_2^{(j)})\right]\right\},$$

$$\sin\theta_d^{(j)} = \frac{\lambda_0}{2n_d^{(j)}V^{(j)}(\vartheta_a^{(j)})} \times \qquad (9)$$

$$\left\{ f^{(j)} - \frac{[V^{(j)}(\vartheta_a^{(j)})]^2}{f^{(j)}\lambda_0^2}\left[n_i^{(j)2}(\vartheta_1^{(j)}) - n_d^{(j)2}(\vartheta_2^{(j)})\right]\right\},$$

where $n_i^{(j)}$ and $n_d^{(j)}$ are the indices of refraction for the incident and diffracted beams, respectively, $\lambda_0$ is the optical wavelength in vacuum, and $V^{(j)}(\vartheta_a^{(j)})$ is the acoustic speed of the j acoustic beam. The non-diffracted beam 22I is the remaining portion of beam 20 that is not diffracted to form diffracted beam 22D. Diffracted beam 22D is a right-handed rotating elliptically polarized beam having a major axis of polarization parallel to the plane of FIG. 1*b*. The angles $\theta_i^{(j)}$ and $\theta_d^{(j)}$ are the angles between the normal to the acoustic wave front vector $K^{(j)}$ and the wave front vectors for incident beam 20 and diffracted beam 22D, respectively, for j=1. The angles $\vartheta_1^{(j)}$ and $\vartheta_2^{(j)}$ are the angles between the optic axis 50 of the acousto-optical modulator cell 47 and the wave front vectors $k_i^{(j)}$ and $k_d^{(j)}$, respectively, for incident beam 20 and diffracted beam 22D, respectively, for j=1. The angle $\vartheta_a^{(j)}$ is the angle between the acoustic wave front vector $K^{(j)}$ and the [110] plane of the paratellurite in acousto-optical modulator cell 47 with acoustic wave front vector $K^{(j)}$ lying in the t-Z plane of the paratellurite (t refers to the [110] direction). The definitions of positive $\theta_i^{(j)}$, $\theta_d^{(j)}$, $\vartheta_1^{(j)}$, $\vartheta_2^{(j)}$, and $\vartheta_a^{(j)}$ are illustrated in FIG. 7.

The angle $\delta^{(1)}$ between the wave front vectors for beams 22I and 22D, $(\theta_i^{(1)}+\theta_d^{(1)})$, is a small angle given by the expressions $$\sin\delta^{(j)} = f^{(j)}\left\{\frac{\lambda_0}{n_i^{(j)}[V^{(j)}(\vartheta_a^{(j)})]}\cos\theta_d^{(j)}\right\} \quad \text{and} \qquad (10)$$

$$= f^{(j)}\left\{\frac{\lambda_0}{n_d^{(j)}[V^{(j)}(\vartheta_a^{(j)})]}\cos\theta_i^{(j)}\right\}$$

for j=1. For purposes of illustration, angle $\delta^{(1)}$ is exaggerated in FIG. 1*c*.

The indices of refraction $\tilde{n}_o$ and $\tilde{n}_e$ for a left-handed rotating elliptically polarized beam, major elliptical axis orthogonal to the plane of FIG. 1*b*, and a right-handed rotating elliptically polarized beam, major elliptical axis parallel to the plane of FIG. 1*b*, respectively, in an optically active birefringent crystal are given by the expressions $$\frac{1}{\tilde{n}_o^2} = \frac{1}{n_o^2}\left[\frac{\cos^2\vartheta}{(1-\gamma)^2} + \sin^2\vartheta\right], \qquad (11)$$

$$\frac{1}{\tilde{n}_e^2} = \frac{1}{n_o^2(1-\gamma)^2}\cos^2\vartheta + \frac{1}{n_e^2}\sin^2\vartheta, \qquad (12)$$

respectively, where $$\gamma = \frac{n_r - n_l}{2n_o}. \qquad (13)$$

For paratellurite at a wavelength of 0.6328 $\mu$m, $$\gamma = 6.76 \times 10^{-5} \qquad (14)$$

The frequency of beam 22D is $f_L + f^{(1)}$ while the frequency of beam 22I is $f_L$. In addition, electrical output 44 is adjusted to achieve a maximum intensity for diffracted beam 22D and a corresponding minimum intensity for non-diffracted beam 22I. Beam 22I is a source of certain other secondary output beams.

Due to the photoelastic interaction of incident beam 22D with the second acoustic beam having a wave front vector $K^{(2)}$, non-diffracted beam 24I and diffracted beam 24D are generated by small angle Bragg diffraction when the relationships given by Eqs. (8) and (9) are satisfied for j=2. Diffracted beam 24D is a left-handed rotating, elliptically polarized beam having a major elliptical axis orthogonal to the plane of FIG. 1*b*. Diffracted beam 24D propagates at the small angle $\delta^{(2)}$, given by Eq. (10) for j=2, to that of non-diffracted beam 24I (see FIG. 1*c*). For purposes of illustration, angle $\delta^{(2)}$ is exaggerated in FIG. 1*c*. The frequency of beam 24D is $f_L + f^{(1)} + f^{(2)}$ while the frequency of beam 24I is $f_L + f^{(1)}$.

The electrical output 64 is adjusted to achieve an intensity for diffracted beam 24D substantially equal to 50% of beam 22D. Accordingly, the intensity for non-diffracted beam 24I and diffracted beam 24D are substantially the same.

Beam 24D is refracted by crystal face 55 as beam 26 and secondary beam 26S (see FIG. 1*d*), beam 26 is refracted by crystal face 56 as beam 28 (see FIG. 1*e*), and beam 28 exits truncated prism 80 at face 57 as output beam 30. For purposes of illustration, the small angle between beam 26 and secondary beam 26S is exaggerated in FIG. 1d. The Surface 57 is antireflection coated the same as surface 54. Beams 26, 28, and output beam 30 are linearly polarized beams with respective polarizations perpendicular to the planes of FIGS. 1b and 1d.

Diffracted beam 24I is refracted by crystal face 55 as beam 27 and secondary beam 27S (see FIG. 1d), beam 27 is refracted by crystal face 56 as beam 29 (see FIG. 1e), and beam 29 exits truncated prism 80 at face 57 as output beam 31. For purposes of illustration, the small angle between beam 27 and secondary beam 27S is exaggerated in FIG. 1d. Beams 27, 29, and output beam 31 are linearly polarized beams with respective polarizations parallel to the planes of FIGS. 1b and 1d.

The amplitudes of beams 26S and 27S relative to the amplitudes of beams 24D and 24I, respectively, are substantially the same as the ellipticities of beams 24D and 24I, respectively, a consequence of electromagnetic boundary conditions imposed on incident and refracted beams at crystal face 55. Thus, the relative amplitudes of corresponding certain of the secondary output beams are substantially $\xi(\vartheta_{24D})$ and $\xi(\vartheta_{24I})$, respectively, where $\vartheta_{24D}$ and $\vartheta_{24I}$ are the angles between the optic axis 50 and the wave front vectors of beams 24D and 24I, respectively. General expressions for $\xi(\vartheta)$ are given by Eqs. (1) and (4) and an expression for $\xi(\vartheta)$ for paratellurite is given by Eq. (5).

Relative amplitudes of certain of the corresponding certain of the secondary output beams are controlled through the design of the angles $\vartheta_{24D}$ and $\vartheta_{24I}$. For example, for a value of $\vartheta_{24D}$ or $\vartheta_{24I}$ of 10 degrees, the corresponding ellipticity is $$\xi\vartheta = 0.031 \tag{15}$$

[see Eq. (5)]. The certain corresponding intensities of the corresponding certain of the secondary output beams for angles $\vartheta_{24D}$ and $\vartheta_{24I}$ equal to 10 degrees is thus approximately $0.96 \times 10^{-3}$, or $\cong -30$ dB.

The respective angles of incidence and refraction for beams 18 and 20 at surface 54 are chosen such that Eqs. (8) and (9) are satisfied. The well-known reflection and refraction properties with respect to directions of propagation of beams are derived from phase matching boundary conditions as $$n_i(\phi_i)\sin\phi_i = n_r(\phi_r)\sin\phi_r \tag{16}$$

where $n_i(\phi_i)$ and $n_r(\phi_r)$ are the indices of refraction of an incident beam and a reflected (refracted) beam, respectively, at a surface and $\phi_i$ and $\phi_r$ are the respective angles of incidence and reflection (refraction).

There is generally a large walk-off at an angle $\Delta$ of the energy flux from the path of the wave front vector for an acoustic beam propagating in the t-Z plane of paratellurite (see Table 1.3 of Xu and Stroud, ibid.). The design of acousto-optical modulation cell 47 depicted in FIG. 1b and having specifications subsequently given as a non-limiting example in Eq. (17) has a $\vartheta_a^{(1)} = 3.43$ degrees and $\vartheta_a^{(2)} = -2.94$ degrees with corresponding $\Delta^{(1)} = 31.8$ degrees and $\Delta^{(2)} = -28.2$ degrees, respectively. It is evident from FIG. 1b that the energy flux for the two acoustic beams do not overlap for the apparatus of the first embodiment.

Figure 1D:
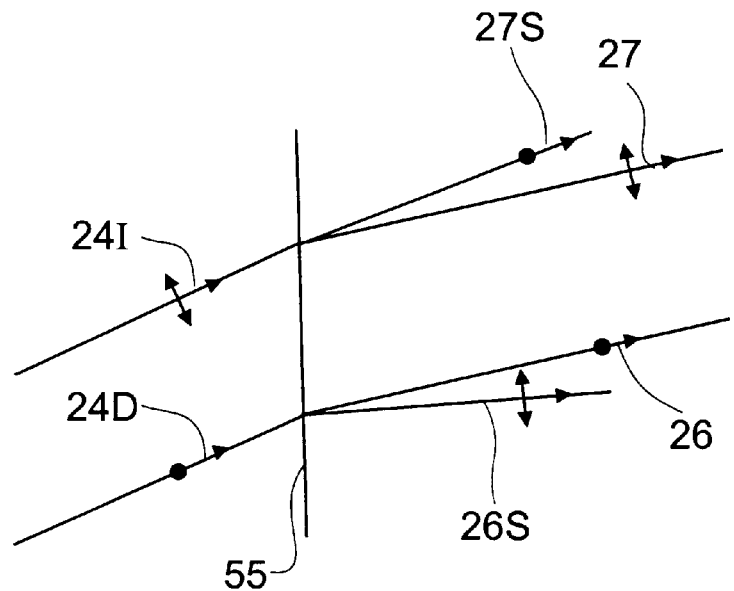
FIG. 1d is an enlarged diagrammatic view showing in more detail the behavior of various light beams at another of the facets of the acousto-optical modulator cell of FIG. 1b.
Figure 1E:
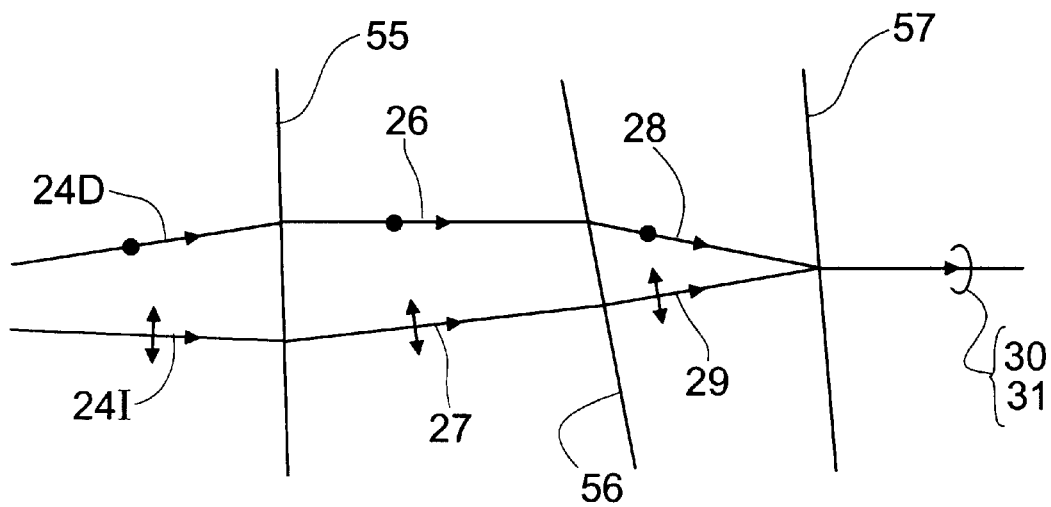
FIG. 1e is an enlarged diagrammatic view showing in more detail the behavior of various light beams at yet another of the facets of the acousto-optical modulator cell of FIG. 1b and external birefringent elements.

Truncated prisms 70 and 80 comprise crystals of PbMoO$_4$ and TeO$_2$, respectively. The optic axes of truncated prisms 70 and 80 are orthogonal to the planes of FIGS. 1b, 1d, and 1e as indicated in the respective figures. The relative orientations of interfaces 55, 56, and 57 are selected such that the output beams are substantially coextensive. The paths of the energy flux vectors for beams 24I, 24D, 26, 27, 28, 29, 30, and 31 are shown in FIG. 1e.

The second subset of the secondary output beams derived from beam 22I have frequencies that are the same as the frequency of beam 16. The directions of propagation of the second subset of the secondary output beams are different from the direction of propagation of output beams 30 and 31. The intensity of the more intense beam of the second subset of the secondary output beams has a nominal value of the order of 1% of the intensity of input beam 18 as a consequence of adjustment of electrical output 44 to obtain a maximum intensity for beam 22D and a corresponding minimum intensity for beam 22I. The intensity of the second more intense beam of the second subset of the secondary output beams has for example a nominal value of the order of 0.001% of the intensity of input beam 18 for a corresponding $\vartheta \cong 10$ degrees in paratellurite [see Eq. (5)]. The second subset of the secondary output beams further have directions of propagation that are different from the directions of propagation output beams 30 and 31 by of the order of 0.01 radians as a consequence of the transit of the second subset of the secondary beams through truncated prisms 70 and 80. The basis of the described properties for the second subset of the secondary output beams is depicted in FIGS. 1d, 1e, and 1f. Thus, contamination of output beams 30 and 31 by the intensities of the second subset of the secondary output beams is $<<10^{-4}\%$ or $<<-60$ dB of the intensity of input beam 18.

The first subset of the secondary output beams derived from beam 20S have frequencies the same as the frequency of the input beam 18. The intensity of the more intense of the first subset of the secondary output beams derived from beam 20S has a value of the order of the square of a respective $\xi(\vartheta)$, an intensity of the order of 0.1% of the intensity of input beam 18 for corresponding values of a $\vartheta \cong 10$ degrees in paratellurite [see Eq. (5)]. The intensity of the second more intense beam of the first subset of the secondary output beams derived from beam 20S has for example a nominal value of the order of $10^{-4}\%$ of the intensity of input beam 18 for corresponding values of $\vartheta \cong 10$ degrees in paratellurite [see Eq. (5)]. The directions of propagation of the first subset of the secondary output beam derived from beam 20S are different from the directions of propagation of output beams 30 and 31 by of the order of 0.01 radians as a consequence of transit of the certain secondary beams derived from beam 20S through truncated prisms 70 and 80. Thus, contamination of output beams 30 and 31 by the intensity of the first subset of the secondary output beam derived from beam 20S is $<<10^{-4}\%$ or $<<-60$ dB of the intensity of input beam 18.

The speed for the shear waves used in the first and second acoustic beams have temperature coefficients of the order of 100 ppm/° C. This temperature sensitivity effects the conditions required to meet Eqs. (8) and (9) and also effects the directions of propagation of output beams 30 and 31. The effects of temperature sensitivity of the acoustic speed of the first acoustic beam and the second acoustic beam are compensated in the first embodiment by two different procedures.

The temperature sensitivity of the acoustic speed of the first acoustic beam effects temperature sensitivities in the directions of propagation of output beams 30 and 31, temperature sensitivities which are substantially the same. The temperature sensitivity of the acoustic speed of the second acoustic beam effects a temperature sensitivity in the small angle $\delta^{(2)}$ and consequently a temperature sensitivity in the angle between directions of propagation of output beams 30 and 31.

The effects of temperature sensitivities of acoustic beam speeds of the first and second acoustic beams and the effects of temperature sensitivities of indices of refractive indices of optical material used in apparatus 40 on the mean direction of the directions of propagations of output beams 30 and 31 are compensated by control of frequency $f^{(1)}$ of the first acoustic beam. The required change in $f^{(1)}$ with temperature to achieve the desired compensation for the non-limiting design example subsequently given in Eq. (17) is $\Delta f^{(1)}/\Delta T = -1.02$ kHz/degC. The control of frequency $f^{(1)}$ is implemented by detection of changes in substantially the mean direction of propagation of output beams 30 and 31 (detector system not shown) and the detected changes in the substantially mean direction of propagation used to generate a feedback signal for servo control of $f^{(1)}$ (servo control system not shown). An alternative procedure for control of $f^{(1)}$ detects changes in temperature of acousto-optical cell 47 by a temperature sensitive element, e.g. a termistor (not shown), in thermal contact with acousto-optical cell 47 and a detected change in the temperature of acousto-optical cell 47 used to effect predetermined change in frequency $f^{(1)}$.

The effect of temperature sensitivity of the acoustic speed of the second acoustic beam, the effect on the difference in directions of propagation output beams 30 and 31, are compensated by the selection of a birefringent crystal for truncated prism 70 having respective refractive indices with relatively large temperature sensitivities, e.g. PbMoO$_4$.

The net effects of temperature sensitivities of acoustic speed of the first and second acoustic beams and the effects of the temperature sensitivities of indices of refraction of optical materials of the apparatus of the first embodiment on the directions of propagation of output beams 30 and 31 are substantially compensated in the first embodiment to the order of $10^{-9}$ rad/degC level.

A specific, but non-limiting design example has the following specifications for modulator cell 47 comprising TeO$_2$:

$$\lambda_0 = 633 \text{ nm},\tag{17}$$

$$f^{(1)} = 42 \text{ MHz},$$

$$f^{(2)} = 20 \text{ MHz},$$

$$\vartheta_a^{(1)} = 3.429 \text{ deg},$$

$$\vartheta_a^{(2)} = -2.941 \text{ deg},$$

$$\phi_1 = 20.528 \text{ deg},$$

$$\phi_2 = 21.342 \text{ deg},$$

Prism angle of element 70 = 2.900 deg,

Prism angle of element 80 = 5.218 deg,

Angle between optic axis 50 and normal to surface 55 = 2.900 deg.

The preferred mode of operation of the first embodiment with respect to conversion of nominally 100% of beam 18 into beams 30 and 31 is also a mode wherein the first embodiment is an effective isolator of laser source 10 with respect to coupling between laser source 10 and return beams. Return beams comprise reflected and/or scattered components of output beams 30 and 31 and of the secondary output beams passing back through the acousto-optical apparatus 40 into laser source 10.

The acousto-optical apparatus 40 transforms components of the return beams in a manner analogous to the transformations experienced by beam 18 except for a reversal in the direction of frequency shifts (cf. R. W. Dixon, ibid.). Consequently, the primary components of the return beams that emerge from the acousto-optical apparatus 40 in a direction opposite to and substantially parallel to input beam 18 will be frequency shifted with respect to the frequency of source 110 by either $+f^{(1)}$, $+2f^{(1)}$, $+(f^{(1)}+f^{(2)})$, or $+2(f^{(1)}+f^{(2)})$ depending on the progenitor beams of the return beam components and on the direction of propagation of the return beam components on entering acousto-optical apparatus 40.

Return beam components that couple to a laser cavity mode of laser source 10 will be those components having the same frequency as beam 18 and therefore the same frequency of the laser cavity mode. The progenitor beams of the return beam components that couple to laser source 10 is beam 22I and the reflected portion of beam 18 at surface 54. The reflected portion of beam 18 is isolated from laser source 10 by the selection of the magnitude of the angle $\phi_1$. The intensity $I_{Re}$ of the component of the return beam component having beam 22I as a progenitor can be expressed as $$I_{Re} = (1-\eta)^2 R I_I \tag{18}$$

where $I_I$ is the intensity of beam 18, R is the fraction of beam 22I reflected and/or scattered back into acousto-optical modulator cell 40 with a direction of propagation the reverse of the direction of propagation of beam 22I, and $(1-\eta)$ is the ratio the intensity of beam 22I to the intensity of beam 20. In the preferred mode of operation of the first embodiment, the electrical output 44 of the power amplifier 43 is adjusted so that the combined intensities of beams 30 and 31 relative to the intensity of input beam 18 are preferably a nominal value of 100%. Thus in the preferred of operation, a typical value for $(1-\eta)$ may be $$(1-\eta) \leq 0.01 \tag{19}$$

Therefore, the first embodiment of the present invention improves the isolation of laser source 10 with respect to non-frequency shifted return beam components typically by a factor of $(1-\eta)^2$, a factor of three to four orders of magnitude, over prior art two frequency generators. The effect of the factor R has been omitted in the comparison noting that the effect of the factor R generally will be common to both the first embodiment of the present invention and prior art two frequency generators.

Figure 2:
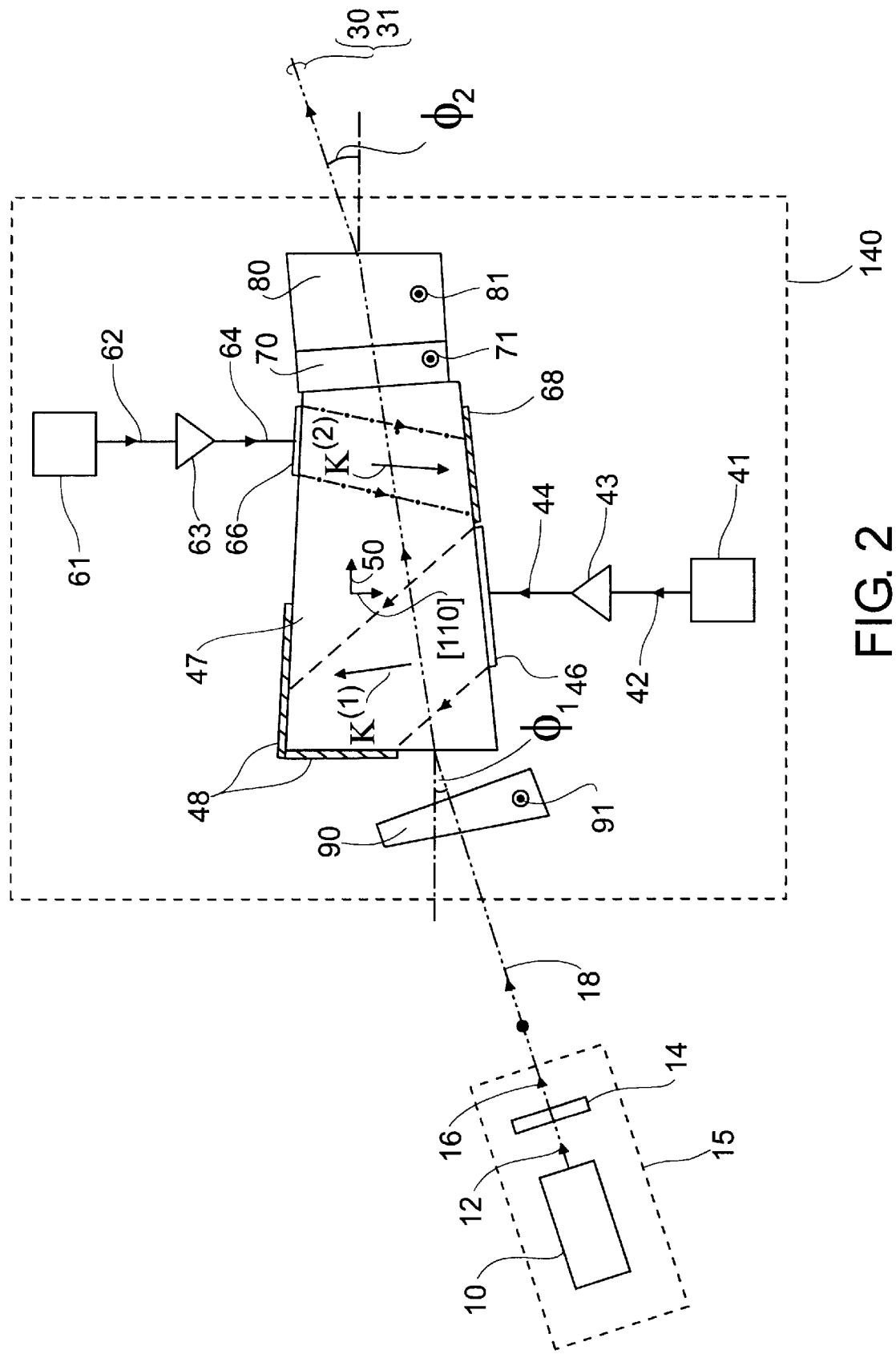
FIG. 2 is a diagrammatic plan view of apparatus of the second embodiment of the present invention showing in combination a laser light source and an acousto-optic modulator cell that transforms the output of the laser beam into two linearly-orthogonally polarized light beams.

The second embodiment of the present invention is depicted, in diagrammatic form, in FIG. 2. In accordance with the second embodiment of the present invention, an acousto-optical apparatus is provided that is capable of transforming a single frequency linearly polarized input beam into a beam comprised of two output beams and a series of spurious, secondary output beams. The input beam is comprised of a single beam. The output beams are substantially linearly, orthogonally polarized, preferably having the same directions of propagation, and preferably having coextensive energy flux profiles. The frequencies of the output beams are different one from the other and different from the frequency of the input beam. The intensities of the two output beams are substantially equal, and the combined intensities of the output beams are substantially equal to the intensity of the input beam. In addition, compensation of both the certain thermal effects is accomplished in the second embodiment through exploitation of the temperature dependence of refractive indices of optical materials comprising the acousto-optical apparatus.

The second embodiment comprises a number of elements that have the same element numbers as certain elements of the first embodiment. The description of the number of elements of the second embodiment shown in FIG. 2 with like numbers as elements of the first embodiment are the same as the description given for like numbered elements of the first embodiment. For example, the description of input beam 18 and of the source of input beam 18 of the second embodiment is the same as corresponding portions of the description given for input beam 18 and of the source of input beam 18 of the first embodiment.

Acousto-optical apparatus 140 comprises elements of acousto-optical apparatus 40 of the first embodiment and a truncated prism 90 as shown in FIG. 2. For the second embodiment, the frequency $f_1$ of oscillator 41 is fixed and compensation for effects of the temperature sensitivity of the speeds of the first and second acoustic beams in acousto-optical modulator cell 47 and for the effects of temperature sensitivities of indices of refraction of optical components comprising acousto-optical apparatus 140 is accomplished by exploiting a temperature sensitivity of an index of refraction of prism 90. A specific, but non-limiting design example for prism 90 has the following specifications: comprised of $LiNbO_3$ with a prism angle of 1.57 deg and optical axis 91 (see FIG. 2) orthogonal to the plane of FIG. 2.

The net effects of temperature sensitivities of acoustic speed of the first and second acoustic beams and the effects of the temperature sensitivities of indices of refraction of optical materials of the apparatus of the second embodiment on the directions of propagation of output beams 30 and 31 are substantially compensated in the second embodiment to the order of $10^{-9}$ rad/degC level.

The remaining description of the second embodiment is the same as corresponding portions of the description given for the first embodiment.

Figure 3:
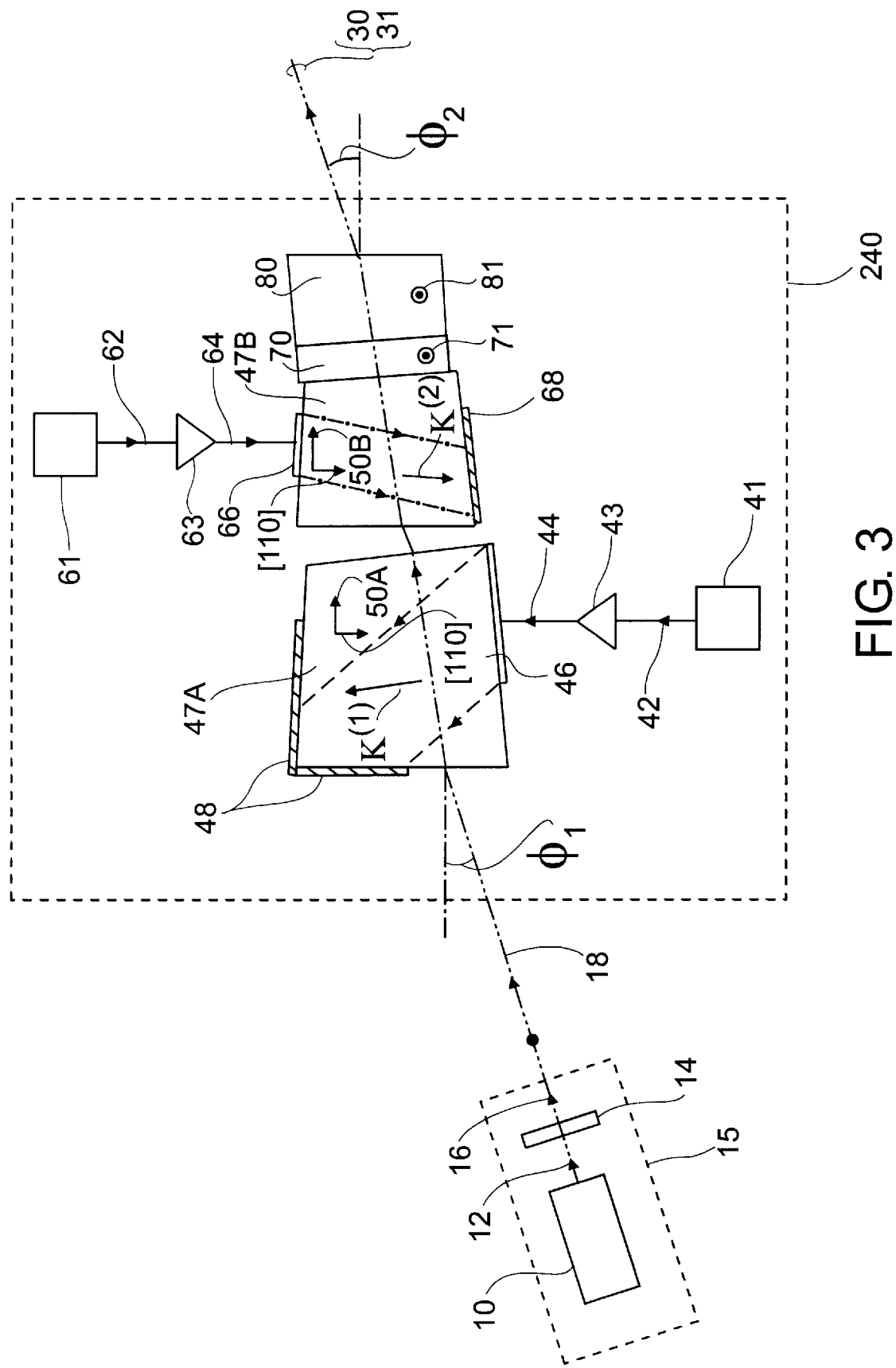
FIG. 3 is a diagrammatic plan view of apparatus of the third embodiment of the present invention showing in combination a laser light source and an acousto-optic modulator cell that transforms the output of the laser beam into two linearly-orthogonally polarized light beams.

The third embodiment of the present invention is depicted, in diagrammatic form, in FIG. 3. In accordance with the third embodiment of the present invention, an acousto-optical apparatus is provided that is capable of transforming a single frequency linearly polarized input beam into a beam comprised of two output beams and a series of spurious, secondary output beams. The input beam is comprised of a single beam. The output beams are substantially linearly, orthogonally polarized, preferably having the same directions of propagation, and preferably having coextensive energy flux profiles. The frequencies of the output beams are different one from the other and different from the frequency of the input beam. The intensities of the two output beams are substantially equal, and the combined intensities of the output beams are substantially equal to the intensity of the input beam. In addition, compensation of both the certain thermal effects is accomplished in the third embodiment through exploitation of the temperature dependence of refractive indices of optical materials comprising the acousto-optical apparatus.

The third embodiment comprises a number of elements that have the same element numbers as certain elements of the first embodiment. The description of the number of elements of the third embodiment shown in FIG. 3 with like numbers as elements of the first embodiment are the same as the description given for the like numbered elements of the first embodiment. For example, the description of input beam 18 and of the source of input beam 18 is the same as corresponding portions of the description given for input beam 18 and of the source of input beam 18 of the first embodiment.

Acousto-optical apparatus 240 comprises two acousto-optical modulator cells 47A and 47B with optic axes 50A and 50B, respectively. As a non-limiting design example, optic axes 50A and 50B are shown in FIG. 3 as parallel vectors with optic axis 50B being orthogonal to the entrance face of modulator cell 47B. For the third embodiment, frequency $f_1$ of oscillator 41 is fixed and compensation for effects of the temperature sensitivities of the speeds of the acoustic beams in modulator cells 47A and 47B and the temperature sensitivities of indices of refraction of optical material comprising acousto-optical apparatus 240 is accomplished by exploiting temperature sensitivities of the indices of refraction of modulator cell 47A comprising a prism angle.

Modulator cells 47A and 47B together are functionally equivalent to modulator cell 47 of the first embodiment with a prism section removed so as to introduce the prism angle in modulator cell 47A (see FIG. 3). The description of modulator cells 47A and 47B is otherwise the same as the corresponding portions of the description of modulator cell 47 of the first embodiment.

The net effects of temperature sensitivities of acoustic speeds of the first and second acoustic beams and the effects of the temperature sensitivities of indices of refraction of optical materials of the apparatus of the third embodiment on the directions of propagation of output beams 30 and 31 are substantially compensated in the third embodiment to the order of $10^{-9}$ rad/degC level.

The remaining description of the third embodiment is the same as corresponding portions of the description given for the first embodiment.

The effects of temperature of the apparatus on the average direction of propagation of the output beams is compensated in each of the fourth, fifth, and sixth embodiments of the present invention. However, the effects of temperature of the apparatus on the difference in directions of propagation of the output beams is not compensated in the fourth, fifth, and sixth embodiments.

Figure 4:
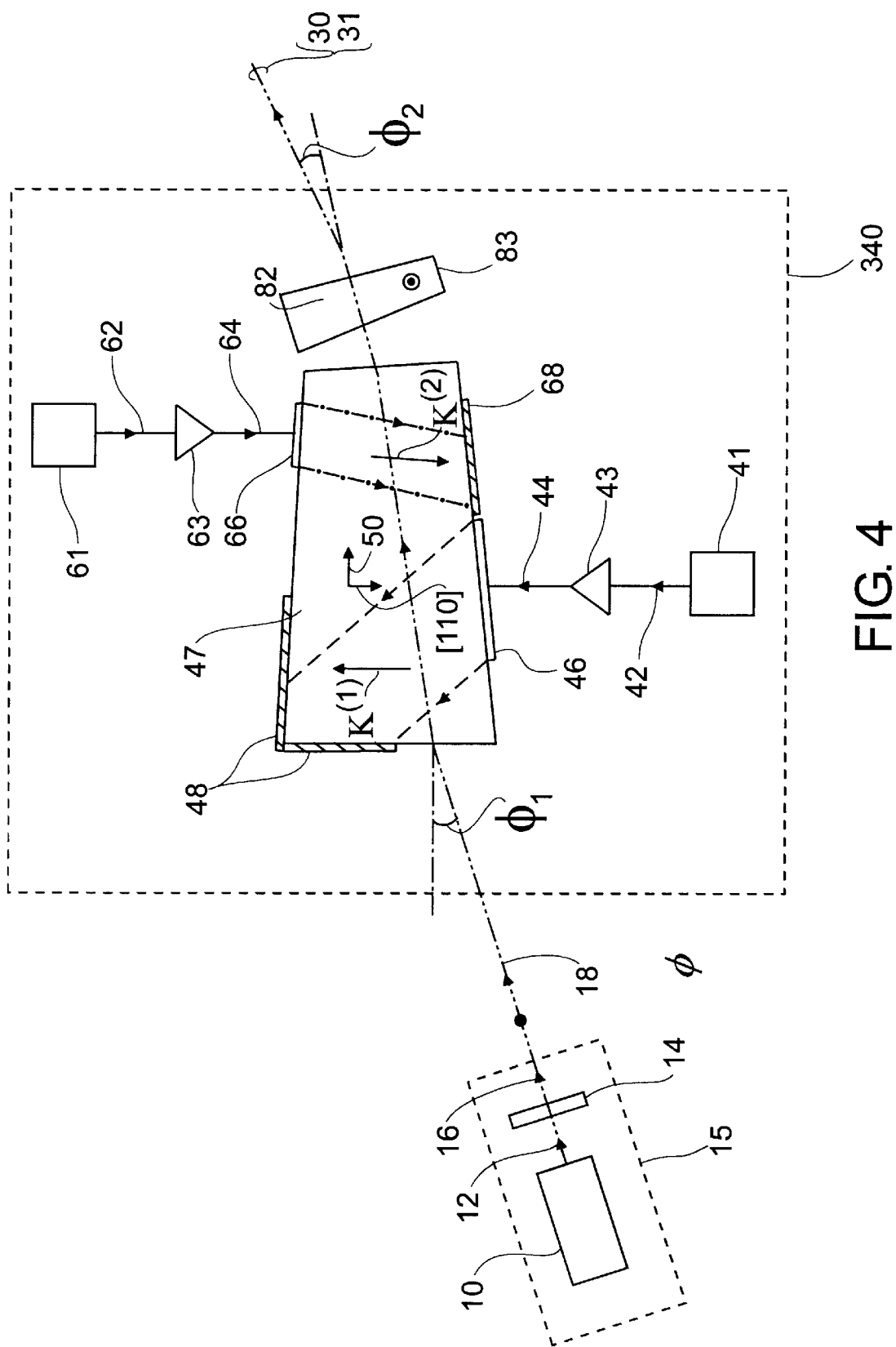
FIG. 4 is a diagrammatic plan view of apparatus of the fourth embodiment of the present invention showing in combination a laser light source and an acousto-optic modulator cell that transforms the output of the laser beam into two linearly-orthogonally polarized light beams.

The fourth embodiment of the present invention is depicted, in diagrammatic form, in FIG. 4. In accordance with the fourth embodiment, an acousto-optical apparatus is provided that is capable of transforming a single frequency linearly polarized input beam into a beam comprised of two output beams and a series of spurious, secondary output beams. The input beam is comprised of a single beam. The output beams are substantially linearly, orthogonally polarized, preferably having the same directions of propagation, and preferably having coextensive energy flux profiles. The frequencies of the output beams are different one from the other and different from the frequency of the input beam. The intensities of the two output beams are substantially equal, and the combined intensities of the output beams are substantially equal to the intensity of the input beam.

In addition, compensation of the effects of temperature of the apparatus on the average direction of propagation of the output beams is compensated in the fourth embodiment by exploitation of an acoustic beam wavelength dependence on the acoustic beam frequency of an acoustic beam used in acousto-optical diffraction performed in the acousto-optical apparatus. However, the effect of temperature of the apparatus on the difference in directions of propagation of the output beams is not compensated in the fourth embodiment.

The fourth embodiment comprises a number of elements that have the same element numbers as certain elements of the first embodiment. The description of the number of elements of the fourth embodiment shown in FIG. 2 with like numbers as elements of the first embodiment are the same as the descriptions given for like numbered elements of the first embodiment. For example, the description of input beam 18 and of the source of input beam 18 for the fourth embodiment is the same as corresponding portions of the description given for input beam 18 and of the source of input beam 18 of the first embodiment.

The fourth embodiment comprises acousto-optical apparatus 340, input beam 18, and a source of input beam 18 as shown in FIG. 4. Acousto-optical apparatus 340 comprises a truncated prism 82 and acousto-optical apparatus 40 of the first embodiment, excluding truncated prisms 70 and 80, as shown in FIG. 4.

Truncated prism 82 performs certain of the functions of truncated prisms 70 and 80 of the first embodiment. The certain of the functions are separation of the spurious beams from the output beams with respect to directions of propagation and to render the output beams with preferably substantially parallel directions of propagation and preferably substantially coextensive energy flux profiles. A specific, but non-limiting design example acousto-optical apparatus 340 has the same specifications for $f^{(1)}$, $f^{(2)}$, $\vartheta_a^{(1)}$, $\vartheta_a^{(2)}$, and $\phi_1$ as given in Eq. (17) for modulator cell 47 of the first embodiment comprising TeO$_2$. In addition, $\phi_2$=8.745 deg, the angle between optic axis 50 and normal to exit surface modulator cell 47 is 4.000 deg, and truncated prism 82 comprised of TeO$_2$ has a prism angle of 7.716 deg and optical axis 83 (see FIG. 4) orthogonal to the plane of FIG. 4. Truncated prism 82 is designed for generation of a minimum angle of deviation.

The net effect of temperature sensitivities of acoustic speed of the first and second acoustic beam and the effects of the temperature sensitivities of indices of refraction of optical materials of the apparatus of the fourth embodiment on the mean direction of the directions of propagation of output beams 30 and 31 are substantially compensated in the fourth embodiment to the order of $10^{-9}$ rad/degC level by control of frequency $f^{(1)}$ of oscillator 41. The required change in $f^{(1)}$ with temperature to achieve the compensation to the order of $10^{-9}$ rad/degC for the non-limiting design example given for the fourth embodiment is $\Delta f^{(1)}/\Delta T$=1.86 kHz/degC.

The uncompensated effect of temperature sensitivities of acoustic speed of the first and second acoustic beam and the effects of the temperature sensitivities of indices of refraction of optical components of the apparatus of the fourth embodiment on the difference in the directions of propagation of output beams 30 and 31 in the fourth embodiment is 1.76 $\mu$rad/degC.

The remaining description of the fourth embodiment is the same as corresponding portions of the description given for the first embodiment.

Figure 5:
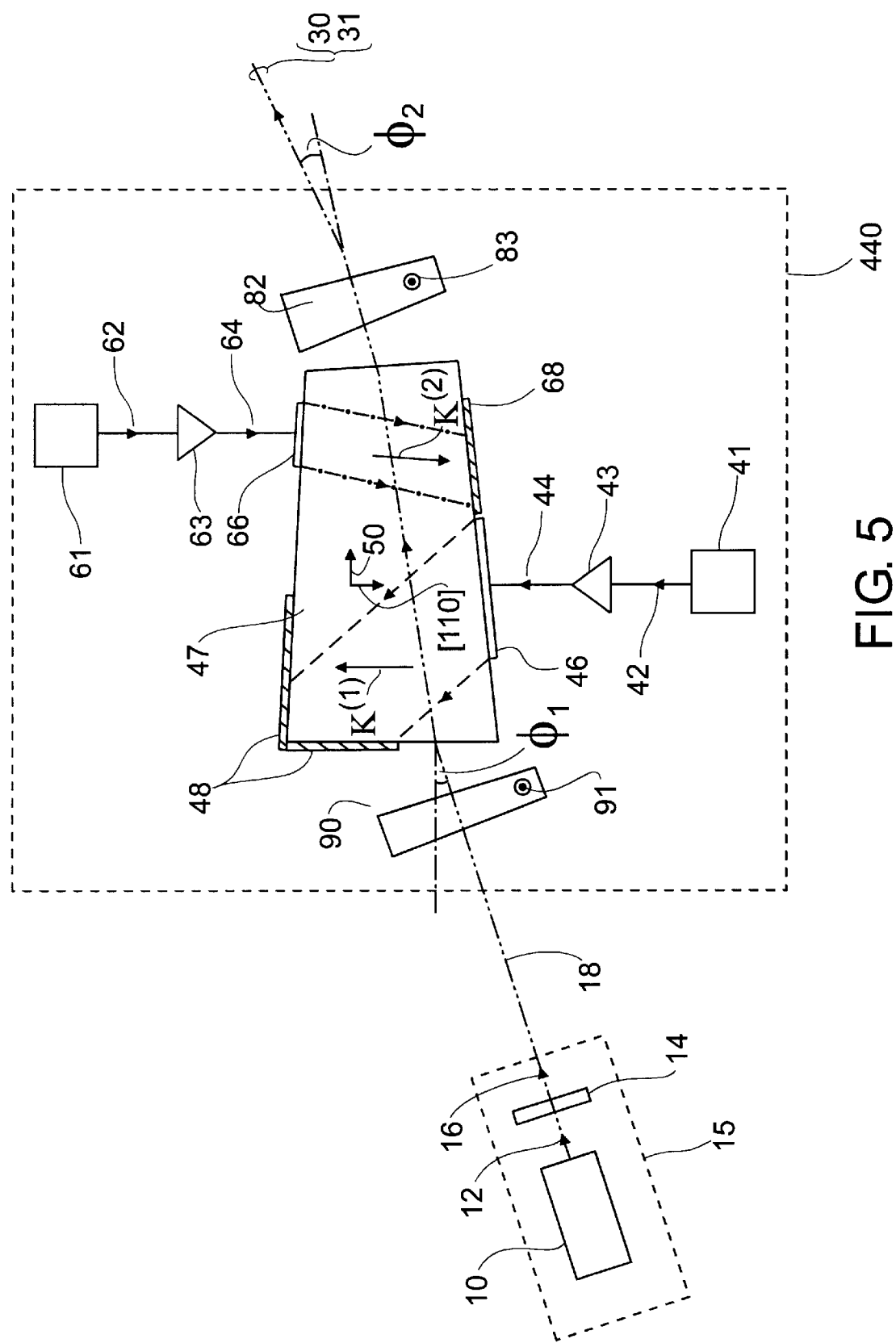
FIG. 5 is a diagrammatic plan view of apparatus of the fifth embodiment of the present invention showing in combination a laser light source and an acousto-optic modulator cell that transforms the output of the laser beam into two linearly-orthogonally polarized light beams.

The fifth embodiment of the present invention is depicted, in diagrammatic form, in FIG. 5. In accordance with the fifth embodiment of the present invention, an acousto-optical apparatus is provided that is capable of transforming a single frequency linearly polarized input beam into a beam comprised of two output beams and a series of spurious, secondary output beams. The input beam is comprised of a single beam. The output beams are substantially linearly, orthogonally polarized, preferably having the same directions of propagation, and preferably having coextensive energy flux profiles. The frequencies of the output beams are different one from the other and different from the frequency of the input beam. The intensities of the two output beams are substantially equal, and the combined intensities of the output beams are substantially equal to the intensity of the input beam.

In addition, compensation of the effect of temperature of the apparatus on the average direction of propagation of the output beams is compensated in the fifth embodiment of the present invention by exploitation of the temperature sensitivities of refractive indices of optical materials comprising the acousto-optical apparatus. However, the effect of temperature of the apparatus on the difference in directions of propagation of the output beams is not compensated in the fifth embodiment.

The fifth embodiment comprises a number of elements that have the same element numbers as certain elements of the second and fourth embodiments. Descriptions of the number of elements of the fifth embodiment shown in FIG. 5 with like numbers as elements of the second and fourth embodiments are the same as the descriptions given for like numbered elements of the second and fourth embodiments. For example, the description of input beam 18 and of the source of input beam 18 for the fifth embodiment is the same as corresponding portions of the description given for input beam 18 and of the source of input beam 18 of the second embodiment.

The fifth embodiment comprises acousto-optical apparatus 440, input beam 18, and a source of input beam 18 as shown in FIG. 5. Acousto-optical apparatus 440 comprises a truncated prism 90 and elements of acousto-optical apparatus 340 of the fourth embodiment as shown in FIG. 5.

Truncated prism 90 of the fifth embodiment performs the same function of truncated prism 90 of the second embodiment. A specific, but non-limiting design example acousto-optical apparatus 440 has the same specifications as the non-limiting design example given for acousto-optical apparatus 340 and a non-limiting design example given for truncated prism 90 comprises LiNbO$_3$ with a prism angle of 2.85 deg. The optic axis for truncated prism 90 is orthogonal to the plane of FIG. 5.

The net effect of temperature sensitivities of acoustic speeds of the first and second acoustic beams and the effects of the temperature sensitivities of indices of refraction of optical material of the apparatus of the fifth embodiment on the mean direction of the directions of propagation of output beams 30 and 31 are substantially compensated in the fifth embodiment to the order of $10^{-9}$ rad/degC level by the temperature dependence of a respective refractive index of refraction of truncated prism 90.

The uncompensated effect of temperature sensitivities of acoustic speeds of the first and second acoustic beams and the effects of the temperature sensitivities of indices of refraction of optical material of the apparatus of the fifth embodiment on the difference in the directions of propagation of output beams 30 and 31 in the fifth embodiment is 1.76 $\mu$rad/degC.

The remaining description of the fifth embodiment is the same as corresponding portions of the description given for the second and fourth embodiments.

Figure 6:
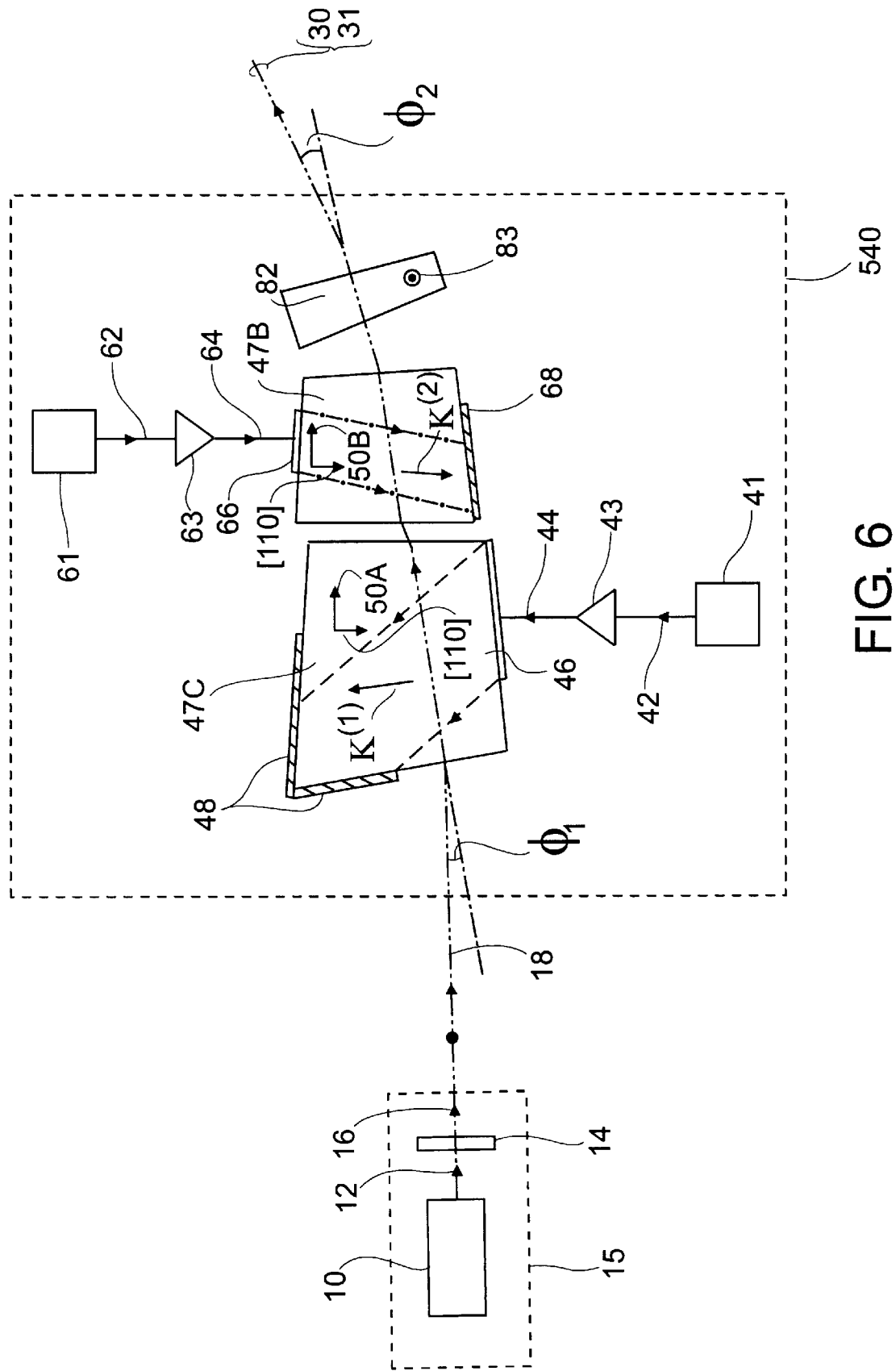
FIG. 6 is a diagrammatic plan view of apparatus of the sixth embodiment of the present invention showing in combination a laser light source and an acousto-optic modulator cell that transforms the output of the laser beam into two linearly-orthogonally polarized light beams.

The sixth embodiment of the present invention is depicted, in diagrammatic form, in FIG. 6. In accordance with the sixth embodiment, an acousto-optical apparatus is provided that is capable of transforming a single frequency linearly polarized input beam into a beam comprised of two output beams and a series of spurious, secondary output beams. The input beam is comprised of a single beam. The output beams are substantially linearly, orthogonally polarized, preferably having the same directions of propagation, and preferably having coextensive energy flux profiles. The frequencies of the output beams are different one from the other and different from the frequency of the input beam. The intensities of the two output beams are substantially equal, and the combined intensities of the output beams are substantially equal to the intensity of the input beam.

In addition, compensation of the effect of temperature of the apparatus on the average direction of the directions of propagation of the output beams is compensated in the sixth embodiment by exploitation of the temperature dependence of refractive indices of optical materials comprising the acousto-optical apparatus. However, the effect of temperature of the apparatus on the difference in directions of propagation of the output beams is not compensated in the sixth embodiment.

The sixth embodiment comprises a number of elements that have the same element numbers as certain elements of the third and fourth embodiments. Descriptions of the number of elements of the sixth embodiment shown in FIG. 6 are the same as corresponding portions of descriptions given like numbered elements of the third and fourth embodiments. For example, descriptions of input beam 18 and of the source of input beam 18 of the sixth embodiment are the same as corresponding portions of the descriptions given for input beam 18 and of the source of input beam 18 of the third embodiment.

The sixth embodiment comprises acousto-optical apparatus 540, input beam 18, and a source of input beam 18 as shown in FIG. 6. Acousto-optical apparatus 540 comprises a modulator cells 47B and 47C, truncated prism 82, and certain elements of acousto-optical apparatus 240 of the third embodiment, excluding truncated prisms 70 and 80, as shown in FIG. 6.

Truncated prism 82 of the sixth performs the same function as that of truncated prism 82 of the third embodiment. The function of modulator cell 47C of the sixth embodiment is the same as the function of modulator cell 47A of the third embodiment. A specific, but non-limiting design example acousto-optical apparatus 540 has the same specifications for $f^{(1)}$, $f^{(2)}$, $\vartheta_a^{(1)}$, $\vartheta_a^{(2)}$, and $\phi_2$ as given for acousto-optical apparatus 340 of the fourth embodiment. In addition, $\phi_1$=5.366 deg, the angle between optic axis 50C and normal to entrance surface of modulator cell 47C is 11.30 deg, optic axis 50C is parallel to the normal to exit surface of modulator cell 47C, optic axis 50B and optic axis 50C are parallel, optic axis 50B is parallel to the normal to entrance surface of modulator cell 47B, and the angle between optic axis 50B and the normal to exit surface modulator cell 47B is 4.000 deg.

The net effect of temperature sensitivities of acoustic speeds of the first and second acoustic beams and the effects of the temperature sensitivities of indices of refraction of optical material of the apparatus of the sixth embodiment on the mean direction of the directions of propagation of output beams 30 and 31 are substantially compensated in the sixth embodiment to the order of $10^{-9}$ rad/degC level by the temperature dependence of a respective refractive index of modulator cell 47C.

The uncompensated effect of temperature sensitivities of acoustic speeds of the first and second acoustic beams and the effects of the temperature sensitivities of indices of refraction of optical material of the apparatus of the fifth embodiment on the difference in the directions of propagation of output beams 30 and 31 in the sixth embodiment is 1.76 $\mu$rad/degC.

The remaining description of the sixth embodiment is the same as corresponding portions of the description given for the third and fourth embodiments.

It will be evident to those skilled in the art that, for end use applications where the difference in frequencies $f^{(2)}$ of output beams can be a variable, effects of the temperature sensitivities of the speeds of the first and second acoustic beams and temperature sensitivities of indices of refraction of optical materials of an acousto-optical apparatus on the difference in the directions of propagation of the output beams can be compensated by control of $f^{(2)}$. The difference in the directions of propagation of the output beams are compensated by control of $f^{(2)}$ for the subsequently described seventh, eighth, and ninth embodiments of the present invention.

The description of the seventh embodiment is the same as corresponding portions of the fourth embodiment of the present invention except that frequency $f^{(2)}$ is controlled so that the difference in the directions of propagation of the output beams can be compensated. Description of control of frequency $f^{(2)}$ is the same the description given for control of frequency $f^{(1)}$ of the first embodiment. The net effects of temperature sensitivities of acoustic speeds of the first and second acoustic beams and the effects of the temperature sensitivities of indices of refraction of optical materials of the apparatus of the seventh embodiment on the directions of propagation of output beams 30 and 31 are substantially compensated in the seventh embodiment to the order of $10^{-9}$ rad/degC level.

For the seventh embodiment, a non-limiting design example is the same as the non-limiting design example given for the fourth embodiment except that $\Delta f^{(1)}/\Delta T$=2.75 kHz/degC and $\Delta f^{(2)}/\Delta T$=1.47 kHz/degC.

The remaining description of the seventh embodiment is the same as the corresponding portions of the description given for the fourth embodiment.

The description of the eighth embodiment is the same as corresponding portions of the sixth embodiment of the present invention except that frequency $f^{(2)}$ is controlled so that the difference in the directions of propagation of the output beams can be compensated. Description of control of frequency $f^{(2)}$ is the same the description given for control of frequency $f^{(1)}$ of the first embodiment. The net effects of temperature sensitivities of acoustic speeds of the first and second acoustic beams and the effects of the temperature sensitivities of indices of refraction of optical materials of the apparatus of the eighth embodiment on the directions of propagation of output beams 30 and 31 are substantially compensated in the eighth embodiment to the order of $10^{-9}$ rad/degC level.

For the eighth embodiment, a non-limiting design example is the same as the non-limiting design example given for the sixth embodiment except that $\Delta f^{(2)}/\Delta T$=1.47 kHz/degC and the angle between optic axis 50C and normal to entrance surface of modulator cell 47C is 16.71 deg.

The remaining description of the eighth embodiment is the same as the corresponding portions of the description given for the sixth embodiment.

The description of the ninth embodiment is the same as corresponding portions of the fifth embodiment of the present invention except that frequency $f^{(2)}$ is controlled so that the difference in the directions of propagation of the output beams can be compensated. Description of control of frequency $f^{(2)}$ is the same the description given for control of frequency $f^{(1)}$ of the first embodiment. The net effects of temperature sensitivities of acoustic speeds of the first and second acoustic beams and the effects of the temperature sensitivities of indices of refraction of optical materials of the apparatus of the ninth embodiment on the directions of propagation of output beams 30 and 31 are substantially compensated in the ninth embodiment to the order of $10^{-9}$ rad/degC level.

For the ninth embodiment, a non-limiting design example is the same as the non-limiting design example given for the fifth embodiment except that $\Delta f^{(2)}/\Delta T=1.47$ kHz/degC and a non-limiting design example given for truncated prism 90 comprises $LiNbO_3$ with a prism angle of 4.22 deg.

The remaining description of the ninth embodiment is the same as the corresponding portions of the description given for the sixth embodiment.

It will be further evident to those skilled in the art that for certain end use applications the acousto-optical apparatus may be placed in a temperature controlled environment. The degree of temperature control of the temperature controlled environment is such that the effects of temperature sensitivities of refractive indices of material of the acousto-optical apparatus and of the temperature sensitivities of acoustic sound speeds of the first and second acoustic beams are not important in an end use application. Acousto-optical apparatus of the second embodiment of the present invention may be used for example for the certain end use applications with frequency $f^{(1)}$ set at a fixed frequency.

Certain changes to the described embodiments will be apparent to those skilled in the art based on the teachings of the invention. For example, it will be evident that the acousto-optical modulator cell 47 may be split into two cells to ease fabrication of transducers 46 and 66 or other exterior layers requiring surface bonding. This is readily accomplished (See FIG. 1a) by having the split occur as a vertical gap starting between transducer 46 and absorber 68 and terminating between absorber 48 and transducer 66. The gap thus formed will have two facing surfaces provided with anti-reflection coatings to enhance throughput by reducing reflection losses. Alignment of the two cells thus formed will require a slight vertical displacement between the two to maintain proper beam alignment that may be accomplished in well-known manners. It should also be evident that it is not necessary that the transducers affixed to the optically active crystal be on oppositely facing facets. They can be on the same facet so that the frequency difference is additive rather subtractive. In addition, it will be evident that two interaction regions are not absolutely essential to obtain beneficial effects. This can be easily seen by imagining the operation of the apparatus with the first interaction region inactivated by turning off the first transducer.

Other variations of the invention will be apparent to those skilled in the art in accordance with its teachings and are intended to be within the scope of the invention as claimed.

What is claimed is:

1. Apparatus for generating a pair of orthogonally polarized beams of different frequency, said apparatus comprising:
   a multifaceted, anisotropic optically active crystal having an optic axis, (z), and having eigenmodes for the propagation of light beams comprising left- and right-handed elliptically polarized modes; said anisotropic optically active crystal having at least one facet with a surface normal that is generally different by a small angle from being orthogonal to said optic axis;
   transducer means affixed to said at least one facet for generating at least one acoustic beam and directing it into said anisotropic optically active crystal so that its direction of propagation is generally different by a small angle from being orthogonal to said optic axis to provide at least one interactive region within said anisotropic optically active crystal where a width of said interactive region is generally coextensive with the width of said acoustic beam;
   means for driving said transducer means to generate said at least one acoustic beam with at least one predetermined frequency;
   means for providing a linearly polarized input beam of illumination with a predetermined frequency, $f_L$;
   means for introducing said input beam into said anisotropic optically active crystal so that it propagates through said at least one interaction region at least once where, by small-angle Bragg diffraction and said at least one acoustic beam with at least one predetermined frequency, said input beam emerges from said at least one interaction region as two emergent beams orthogonally polarized and altered in frequency with respect to each other, said emergent beams continuing to propagate through said anisotropic optically active crystal along a generally coextensive path as slightly diverging orthogonally polarized emergent beams; and
   means for intercepting said diverging emergent beams and controlling them so that they travel as output beams away from said anisotropic optically active crystal along paths having a predetermined angular divergence.

2. The apparatus of claim 1 wherein said transducer means comprises at least one piezoelectric transducer bonded to said at least one facet.

3. The apparatus of claim 2 wherein said driving means comprises a stabilized electrical oscillator for generating an electrical signal at said at least one predetermined frequency and a power amplifier for receiving said electrical signal, amplifying it, and supplying power to said transducer means.

4. The apparatus of claim 1 wherein said driving means is structured to selectively control the portion of said input beam that is converted to one of said two emergent beams.

5. The apparatus of claim 4 wherein said portion of said input beam that is converted to said one of said two emergent beams is substantially fifty (50%) percent.

6. The apparatus of claim 1 wherein said input beam enters and exits said at least one interactive region as an ordinarily polarized beam and said one of said two emergent beams is extraordinarily polarized or vice versa.

7. The apparatus of claim 1 wherein said anisotropic optically active crystal comprises a uniaxial optically active crystal.

8. The apparatus of claim 7 wherein said anisotropic optically active crystal is selected from the group comprising $TeO_2$, paratellurite, the mercurous halides, $Hg_2Cl_2$, $Hg_2Br_2$, and $Hg_2I_2$, and quartz.

9. The apparatus of claim 1 wherein selected ones of the facets of said anisotropic optically active crystal are provided with absorbing material to absorb any acoustic power passing through to said selected ones of the facets.

10. The apparatus of claim 1 wherein one of the facets of said anisotropic optically active crystal serves as an entrance facet for coupling said input beam into said anisotropic optically active crystal and wherein said entrance facet is anti-reflection coated to facilitate coupling said input beam therethrough.

11. The apparatus of claim 1 wherein said output beams are substantially parallel.

12. The apparatus of claim 1 wherein said means for intercepting said diverging emergent beams and controlling them comprises prismatic means.

13. The apparatus of claim 12 wherein said prismatic means comprise a pair of truncated prisms of different material composition and optical properties.

14. The apparatus of claim 13 wherein the optical properties of said truncated prisms are such that they compensate for any differences between the directions of propagation of the wavefronts of said diverging emergent beams.

15. The apparatus of claim 14 wherein the optical properties of said truncated prisms are such that they compensate for effects of any differences between the directions of propagation of the wavefronts of said diverging emergent beams and their respective energy flux vectors.

16. The apparatus of claim 15 wherein the optical properties of said truncated prisms are such that they compensate for effects of changes of the speed of said acoustic beam and effects of changes of the indices of refraction of the material of said apparatus with temperature on the relative directions of propagation of the said output beams.

17. The apparatus of claim 1 further comprising:

(a) another transducer means affixed to a facet of said anisotropic optically active crystal, said facet having a surface normal that is generally different by a small angle from being orthogonal to said optic axis, said another transducer means being operative to generate another acoustic beam and direct it into said anisotropic optically active crystal so that its direction of propagation is generally different by a small angle from being orthogonal to said optic axis to provide another interactive region within said anisotropic optically active crystal where a width of said another interactive region is generally coextensive with the width of said another acoustic beam and arranged generally along the direction of travel of said input beam; and (b) means for driving said another transducer means to generate said another acoustic beam at another predetermined frequency;

said input beam entering said at least one interactive region so that substantially all of it is converted to a second beam, said second beam entering said another interactive region where it is converted by small-angle Bragg diffraction into two beams of substantially equal intensity that further propagate through said anisotropic acoustically active crystal as said orthogonally polarized emergent beams, one of said emergent beams having been altered in frequency by $f^{(1)}$ and one by $f^{(1)} \pm f^{(2)}$ where $f^{(1)}$ is said at least one predetermined frequency of said at least one acoustic beam and $f^{(2)}$ is said another predetermined frequency of said another acoustic beam.

18. The apparatus of claim 17 wherein said transducer means and said another transducer means are affixed to oppositely facing facets of said anisotropic optically active crystal so that one emergent beam is altered by frequency $f^{(1)}$ and the other by frequency $f^{(1)}+f^{(2)}$.

19. The apparatus of claim 17 wherein said output beams are substantially parallel.

20. The apparatus of claim 17 wherein said means for intercepting said diverging emergent beams and controlling them comprises prismatic means.

21. The apparatus of claim 20 wherein said prismatic means comprise a pair of truncated prisms of different material composition and optical properties.

22. The apparatus of claim 21 wherein the optical properties of said truncated prisms are such that they compensate for any differences between the directions of propagation of the wavefronts of said diverging emergent beams.

23. The apparatus of claim 21 wherein the optical properties of said truncated prisms are such that they compensate for effects of any differences between the directions of propagation of the wavefronts of said diverging emergent beams and their respective energy flux vectors.

24. The apparatus of claim 17 wherein at least one of said drivers is selectivley varied in frequency to compensate for thermally induced changes in the average direction of travel in said output beams.

25. The apparatus of claim 17 wherein both of said drivers are selectively varied in frequency to compensate for thermally induced changes in the average direction of travel and differences in the directions of propagation of said output beams.

26. The apparatus of claim 17 further including input prismatic means to compensate for thermally induced changes in the average direction of travel of said output beams.

27. The apparatus of claim 17 wherein said multifaceted, anisotropic opticall active crystal is split to compensate for thermally induced changes in the average direction of travel.

* * * * *